US007299122B2

(12) United States Patent
Perkins

(10) Patent No.: US 7,299,122 B2
(45) Date of Patent: Nov. 20, 2007

(54) ON DEMAND BOOST CONDITIONER (ODBC)

(76) Inventor: Michael T. Perkins, 902 McPhaul St., Austin, TX (US) 78758-4808

( * ) Notice: Subject to any disclaimer, the term of this patent is extended or adjusted under 35 U.S.C. 154(b) by 0 days.

(21) Appl. No.: 11/287,974

(22) Filed: Nov. 15, 2005

(65) Prior Publication Data

US 2006/0122762 A1    Jun. 8, 2006

(51) Int. Cl.
G06F 19/00    (2006.01)
F02B 33/00    (2006.01)
F02B 29/04    (2006.01)

(52) U.S. Cl. .................... 701/102; 123/563; 60/599
(58) Field of Classification Search .............. 701/102, 701/103, 115; 123/563, 565; 60/599, 608
See application file for complete search history.

(56) References Cited

U.S. PATENT DOCUMENTS

| 4,485,310 | A |   | 11/1984 | de Valroger | ............... 290/52 |
| RE32,286 | E | * | 11/1986 | Imai et al. | ............... 701/102 |
| 4,724,817 | A |   | 2/1988 | Cook | ............... 123/565 |
| 5,577,385 | A |   | 11/1996 | Kapich | ............... 60/612 |
| 5,638,796 | A |   | 6/1997 | Adams | ............... 123/565 |
| 6,328,024 | B1 |  | 12/2001 | Kibort | ............... 123/565 |
| 6,461,265 | B1 |  | 10/2002 | Graham | ............... 475/5 |
| 6,580,025 | B2 |  | 6/2003 | Guy | ............... 136/201 |
| 6,609,416 | B2 |  | 8/2003 | Brock | ............... 73/116 |
| 6,615,809 | B1 |  | 9/2003 | Martin | ............... 123/559.1 |
| 6,718,955 | B1 |  | 4/2004 | Knight | ............... 123/559.1 |
| 6,751,957 | B2 |  | 6/2004 | Morgan | ............... 60/608 |
| 6,779,737 | B2 |  | 8/2004 | Murray | ............... 237/2 |
| 7,067,319 | B2 | * | 6/2006 | Wills et al. | ............... 436/37 |

FOREIGN PATENT DOCUMENTS

GB    2231142 A    11/1990    ............... 165/54
JP    403134229 A    6/1991    ............... 123/536

OTHER PUBLICATIONS

"Brushless DC", Ward Brown, DS00857A, 2002, Microchip Technology Inc. www.microchip.com.
Electrical an electronic equipment for 42V networks Road vehicles, Sep. 8, 2004, ISO/PRF 21848, Electrical loads.
A purely Ultracapacitor Energy Storage System for Hybrid Electric Vehicles Utilizing a Microcontroller-Based dc-dc Boost Converter Safeting, 2003, 1998, Cegnar, etal U of Idaho FAA, AC 43.13-1B.

* cited by examiner

*Primary Examiner*—Stephen K. Cronin
*Assistant Examiner*—Johnny H. Hoang
(74) *Attorney, Agent, or Firm*—PEI; Michael T. Perkins

(57) ABSTRACT

An integrated system for increasing power output from an internal combustion engine. System facilitates an interface for controlling and conditioning of the amount of intake air into an internal combustion engine. The system interfaces to a controller and provides critical data, an active intercooler, power buffer, and an electrically driven supercharger. An operator interface provides monitoring and control to a controller for expanded operator control. A power buffer relieves host power system from loading during high demand operation. A system of advanced sensors and processing from a controller combine to facilitate maximum power output with reduced risks. Active heat removal enables system operation in a vehicle at rest or in traffic. Active conditioning system flexibility facilitates improved implementation of cold temperature environment starting and operation. A low cost option with commercial non-positive displacement blowers implements affordable enhancements for internal combustion engines.

22 Claims, 13 Drawing Sheets

ON DEMAND BOOST CONDITIONER (ODBC)

FEDERALLY SPONSORED RESEARCH

Not Applicable

SEQUENCE LISTING OR PROGRAM

Not Applicable

BACKGROUND-FIELD OF INVENTION

The present invention relates to the field of electronically controlled incoming air compressors or boosters with active intercooling or after-cooling for enhancing power from such as internal combustion (compression or sparked combustion) engines (gas or other fuel).

BACKGROUND-DESCRIPTION OF PRIOR ART

The purpose of using compressors or boosters with internal combustion engines is to force a larger amount of air molecules into an engine (then the engine can ingest unaided). The motivation behind this purpose is to produce more power from the same engine. Classical configurations to facilitate boost on internal combustion engines have centered on exhaust driven (turbocharger) and belt driven (supercharger) technologies. These existing devices for improving power output on internal combustion engines suffer from various shortcomings that distract from their purpose, making power. When turbo type technology is used exhaust backpressure is incurred, as is a high level of heat soak. With these conditions the amount of power available is degraded substantially as is system reliability and longevity. Classical supercharging incorporates some type of mechanical drive from an engine's rotating members. This technology incurs larger amounts of parasitics (25% or more) on the engine's rotating members and experiences similar but less significant heat soak. Therefore, reduced power gains are all that is available with these classical drive mechanisms.

Furthermore classic drive schemes require extensive bracketry for physical mounting and custom manifolds for incorporation into an engine input. These brackets, manifolds and plumbing are costly and take up space in already tight engine compartment.

Additionally, increases in power from larger boosting values result in considerable temperature increases of the air being inducted into a boosted engine. Two factors contribute to this temperature increase:
1. Compressing any fluid or gas (in this case air) will increase the gas's temperature directly,
2. Heat soak will affect air flowing through boosters that are bolted to engines by as much as 100° Fahrenheit over ambient. Superchargers secured (as with bolts) to an engine must be located close to the engine's main mechanical drive (usually the crankshaft). Temperatures in these areas are typically between 160° and 225° Fahrenheit. Turbochargers are bolted into the exhaust pipe as close to exhaust header as possible. Exhaust headers typically operate near 1,000° Fahrenheit.

The majority of engines are optimized to produce the maximum amount of power given the fuel available, compression ratio, minus emission compromises and a safety margin. Therefore, adding boost to engines increases the temperature inside the cylinders, at some point these additions of charged air will cause heat problems inside the combustion chamber. If this heat is sufficient to raise the cylinder temperature over about 1075° absolute (615° F.) knock or pre-ignition will occur. Although 1075° absolute is affected by many factors including compression, octane, and ambient temperature, it is an arbitrary value that should not be exceeded for safe operation. Knock will result, causing an engine to fail very quickly and not produce expected or required amounts of power. Boosted systems typically begin to experience these temperature problems in the 4 to 7 pounds per square inch (psi) boost range, depending on fuel, compression and valve timing.

Methods for reducing temperature of boosted air involve heat exchangers called intercoolers or after coolers. These devices exchange temperature with radiators acting as heat sinks. There are various technologies employed to dispense the heat collected by intercoolers. Technologies include air-to-air, air-to-water, and thermoelectric exchangers. All intercoolers produce some pressure drop while removing heat from boosted air, many factors, including intercooler length directly increase pressure drops. Designers must balance combustion chamber temperature with boost, technology, and size of an intercooler to achieve the desired results.

In an effort to address the parasitics problem, electric motor booster adaptations have also been constructed. The challenge confronting designers with these approaches centers on the high speed (measured in revolutions per minute (RPM)) with high torque requirements for the motor necessary to produce the desired performance. Implementations of electric motor driven superchargers and turbochargers have relied on belts, gears and pulleys to obtain the required power and speed. These embodiments suffer from the same complications devices they are attempting to replace. These complications include friction, gear lash, additional heat build up, and shortened life. To date direct drive embodiments were not able to attain the power and speed necessary for performance that off sets the cost of system acquisition and operation. Additionally, the attempts at solving reduced pressure at the reduced speeds have led to compromised supercharger designs in impeller size and shape. These efforts have resulted in systems with shortened life spans and modest performance gains. State of the art bearings have recently made great advances with magnetics and ceramics technologies that can be coupled with advanced motor winding techniques and miniaturized digital signal processors (DSP). These advances are greatly improving the control accuracy and performance of electric motors in both speed (RPM) and torque.

To date no system has been disclosed that offers internal combustion engines reduced emissions and increased performance without the above described limitations. This deficit is due mostly to the lack of capabilities that follow. No system capable of operating with a controller has been proposed that can provide data for supervisoral and scheduling operations, enhancements, recharging, and facility for system override of an actively chilled electronic supercharger. No controllable conditioner with active temperature enhancement for increased temperature range was available prior to disclosure by present author, Flowing Fluid Conditioner (FFC), Perkins, 10/930,998, 08/31/2004. No warmer type intercooler with active temperature enhancement was available prior to FFC. No system can alternately cool or warm boosted air is available prior to FFC. No electronically controllable booster that would integrate into an on-demand configuration with temperature compensation was available. No system buffer was available that complements a smart controller. No system capable of providing a controller was available without System and Method for Smart Control for Flowing Fluid Conditioners (SSCFFC), Perkins, 60/629,814, dated. Nov. 19, 2004. No system that could provide advanced sensing capabilities for providing data for measurement of critical temperature and combustion signatures was available. No system that was available could provide data for these functions, be compatible with OBD-2 and CAN standards, and through a controller interface them interactively with the host vehicle.

OBJECTS AND ADVANTAGES

In view of the state of the art, the On Demand Boost Chiller (ODBC) achieves the primary goal of providing a system that can enhance the functional implementation of smaller engines and still achieve the goals of reduced emissions, increased fuel economy, and increased performance. The following object and advantages realize this goal:

a. It is an object of ODBC to implement a system that provides data to and can be controlled by a controller that tracks, supervises, schedules, operates, enhances, recharges and provides system overrides.
b. It is an object of ODBC to implement an active exchanger/conditioner that is controllable by the smart controller.
c. It is an object of ODBC to implement an active exchanger/conditioner with increased temperature compensation range.
d. It is an object of ODBC to implement an active exchanger/conditioner that can chill or warm fluids.
e. It is an object of ODBC to implement a booster that is controllable by a controller.
f. It is an object of ODBC to implement a booster that will increase volumes of incoming air to an engine.
g. It is an object of ODBC to implement a booster that will reduce "turbo lag" and provide improved engine response.
h. It is an object of ODBC to implement a booster that in conjunction with a controller implements a normalized power curve.
i. It is an object of ODBC to implement a buffer system that allows ODBC operation without causing the host system excessive parasitics during high-demand, high-load conditions.
j. It is an object of ODBC to implement a sensor system to "feed" a controller with critical temperature and combustion data.
k. It is an object of ODBC to implement an ODBC that through a controller will interface and interact with OBD-2 and CAN standards.
l. It is an object of ODBC to provide a low cost version with such as a battery operated leaf blower to act as a supercharger coupled with conditioning and control functions.

SUMMARY

In accordance with the present invention ODBC, affords an integrated system capable of operating with a controller. ODBC in conjunction with the smart controller will raise the amount of air taken into an engine and maintain safe (avoid pre-ignition) "charged" air temperature. ODBC will monitor host vehicle vitals, provide same to a controller and enhance performance as instructed by a controller as required by the operating conditions, system operation, and driver demands.

Accordingly, a summary of objects and advantages of this invention are:

a. A system that will function with a controller that supervises operation, sequencing, and scheduling of ODBC enhancement functions. Data are made available to coordinate temperature management, recharging, and emission reduction. Additionally, ODBC implementing the calculations of a controller will increase performance, override if a problem occurs, and manage a normalized power curve for predictable power availability.
b. A Chiller (active) element that will increase exchanger temperature ranges, reduce response lag, lower emissions, and with reduced size; offer lower pressure drops that lengthy intercooler configurations experience.
c. A warmer (active) element that will preheat in anticipation of starting in cold conditions. The warmer will also improve drivability, and lower emissions in these conditions.
d. A booster (electronically controlled) component that can be mounted to avoid engine heat soak and offer minimal physical size for mounting ease. The booster will interface with a controller and immediately (on demand) deliver to a host engine increases in air volume with less lag and improved performance response. The booster will also offer minimal rotating mass to facilitate speed up and slow down as part of implementing the normalized power curve.
e. A buffer component that offers increased power storage, recharging and expanded operation duration. The buffer will remove parasitics during high demand periods increasing flexibility and efficiency. Power sources may include battery, fuel cell, ultra capacitors (Maxwell BOOSTCAP) http://www.maxwell.com/ultracapacitors/), or small combustion engine.
f. A collection of advanced sensors that will keep the smart controller informed of engine status, system conditions, internal and environmental conditions, and operational demands or loading. The advanced sensor family includes thermistors or thermocouple for temperature measurement. A throttle position sensor (TPS) monitor to ascertain driver needs. An advanced piezoelectric diaphragm sandwich configuration sensor to monitor exhaust and/or intake air streams to inform the smart controller how the cylinder combustion signature appears. This sensor's extremely high band width allows sufficient sampling rates for accurate snap shots of engine combustion wavefronts, not average pictures available from existing technologies. These data are sent to a controller that collects and analyzes these data and from waveform analysis can anticipate the engine performance requirements and optimize a combustion solution for efficiency and engine safety.
g. Interface enhancements are available from a controller. These interfaces included the existing standards for vehicles starting with OBD-2 through CAN. These interfaces enable system interaction and interoperability with host vehicle and vital operating information (i.e. TPS, RPM, vehicle speed, barometric pressure, and temperatures. Additional commercial and industrial computer bus standards are also easily facilitated by ODBC.

ODBC's processor can calculate the power output from the parameters available from the host vehicle's engine control unit (ECU) and calibrate data entered on initial start up (FIG. 8) to determine engine performance and operator demands.

Approximate horsepower can be calculated. From Newton F=ma. Power=F*speed. Power=mass*acceleration*speed. So a vehicle at 2500 lbs is 2500/32.2=78 slugs. If a 0-60 time for that vehicle is 6 seconds. 60 mph=88 ft/sec $$\text{Power} = 78 \text{ slugs} * (88 \text{ ft}/s)/6s * 88 \text{ ft/sec}$$

$$= 100207 \text{ ft} - \text{lb/sec}(1 \text{ hp} = 550 \text{ ft} - \text{lb/sec})$$

$$= 182.2 \text{ hp at sea level}(29.92"Hg, 60° \text{F., dry air})$$

consider that power loss in drive train is 11 to 22% typically.

A look up table can afford corrections for barometric pressure and temperature. SAE J1349 offers actual correction values.

is:

$$cf = 1.180 \cdot \left[ \left( \frac{990}{P_d} \right) \cdot \left( \frac{Tc+273}{298} \right)^{0.5} \right] - 0.18$$

where: cf=the dyno correction factor

Pd=the pressure of the dry air, mb (signal 195)

Tc=ambient temperature, deg C (T1)

On a hot day, or at high altitude, or on a dry day the air is less dense. A reduction in air density reduces the amount of oxygen available for combustion and therefore reduces the engine horsepower and torque. Density altitude is defined as the pressure altitude corrected for the effects of temperature and humidity. Density altitude affects engine horsepower of a normally aspirated engine. A reduction in air density reduces the amount of oxygen available for combustion and therefore reduces the engine horsepower and torque.

Corrections are excellent for accurate comparisons and factual discussions however a predictable amount of power is the goal and a flat power curve is best for controlled driving. ODBC approach centers on building a system with 20% greater capacity (horsepower production) and backing off actual maximum output to target capacity. For example a 150 hp normally aspirated engine with 7 psi boost will get roughly 225 hp. Normal atmospheric pressure is 14.7 psi. Raise the cylinder pressure 50% and you get 50% more mixture in the combustion chamber to ignite (all else being equal). So with a booster capable of say 10 psi the same engine can get to the target 225 hp more quickly and with rapid sampling and calculations the smart controller with Pulse Width Modulation (PWM) techniques can "regulate" the output of the engine at 225 hp at lower and higher RPMs (because the booster has a reserve and a conditioner to keep air temperature low). The driver experiences a very responsive engine that will safely produce a uniform amount of power. And enthusiast (the speed freaks) can run it wide open and experience the thrill ride (off road situations).

The majority of performance requirements when driving on streets and highways will be satisfied by short bursts of power on the order of less then thirty seconds. Even drag racing a typical performance vehicle will be staged and complete a quarter mile in 30 seconds or less time. ODBC is ideally suited to be adapted to multiple designs (hybrid, diesel or gas economy, alternative fuel or performance and racing). ODBC can be used as an input to any system that can benefit from increased power with lower input temperatures for situational needs.

DRAWINGS

DRAWING FIGURES

FIG. 1*a* is a perspective frontal view of the preferred embodiment of my conditioner in a vehicle.

FIG. 1*b* is a front view of the preferred embodiment of my conditioner.

FIG. 1*c* is a rear view of the preferred embodiment of my conditioner.

FIG. 1*d* is an exploded view of the preferred embodiment of my conditioner.

FIG. 1*e* is an exploded view of the preferred embodiment of my Advanced Sensor mounting.

FIG. 2 is a functional side view of my conditioner.

FIG. 3*a* is a block diagram of control functions of my conditioner.

FIG. 3*b* is a detailed block diagram of the power and host interface for my conditioner.

REFERENCE NUMBERS IN DRAWINGS

Figure 1A:
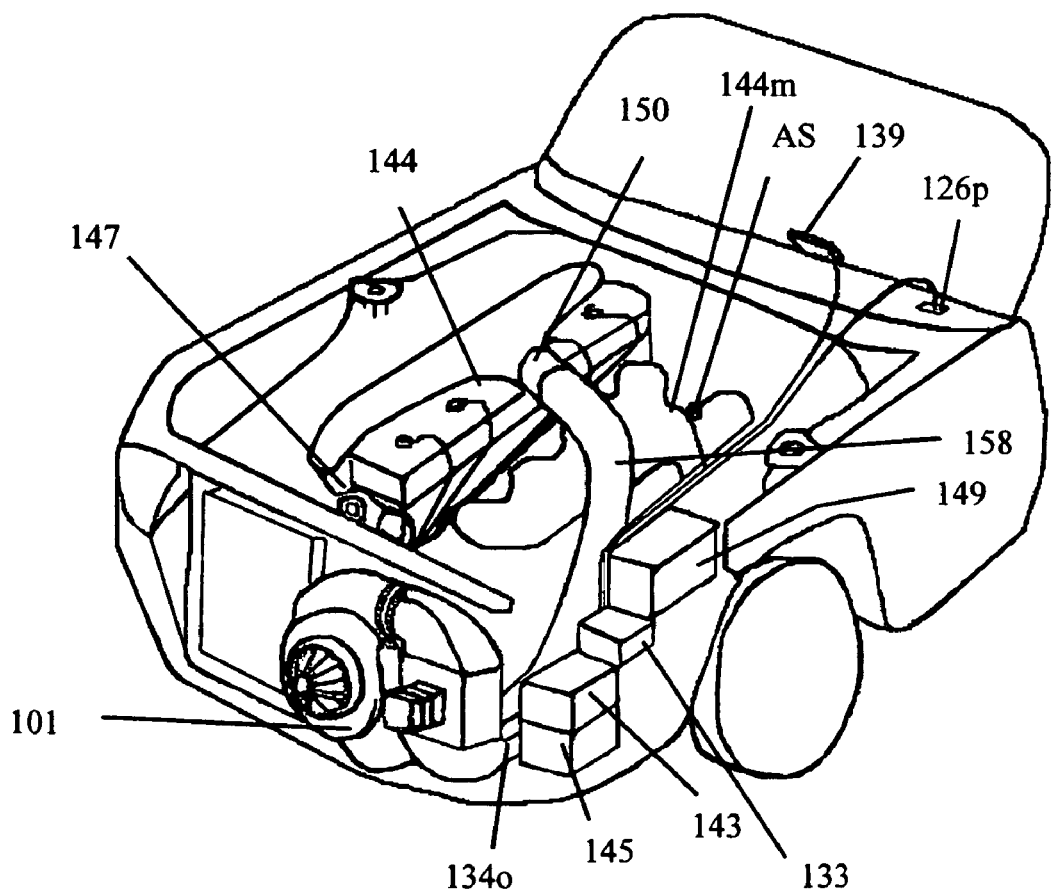

| Number | Title | Supplier |
|---|---|---|
| 101 | On Demand Boost Conditioner (ODBC) | |
| 102b | Brace 102 (f to r) bolt (X4) | Grade 5, 5/16" NC |
| 102f | Brace (front) bracket (X2) | Steel |
| 102g | Mounting hole (in brace 102f) (X2) | 5/16" |
| 102h | Threaded hole (in brace 102r) (X2) | 5/16" NC |
| 102r | Brace (rear) bracket (X2) | Steel |
| 103 | Turbine housing | Majestic turbo www.majesticturbo.com |
| 103b | Mounting hole (X3) in 103f | 5/16" |
| 103f | Front half housing 103 | |
| 103h | Mounting hole (X4) | Aligned mounting tab holes in housings 103f and 103r, 5/16" |
| 103m | Mounting plate air cleaner 104, by-pass 109 to housing 103 | |
| 103n | Threaded mounting hole in plate 103m (X3) | 5/16" NC |
| 103o | Turbine housing outlet | |
| 103r | Rear half housing 103 | |
| 104 | Air cleaner (K&N filters) | www.knfilters.com |
| 104c | Hose clamp | 2.5 to 4.0" www.idealclamp.com |
| 104t | Air cleaner throat | plastic |
| 105 | Conditioner housing | Isolative composite or Glass reinforced plastic, double walled |
| 105c | Conditioner housing cover | Isolative composite or Glass reinforced plastic, double walled |

-continued

| Number | Title | Supplier |
|---|---|---|
| 105f | Conditioner housing front | Isolative composite or Glass reinforced plastic, double walled |
| 105i | Conditioner housing inlet | 2" to 3" typical Isolative composite or Glass reinforced plastic |
| 105o | Conditioning cover opening for TED 107 mounting | |
| 105r | Conditioner housing rear | Isolative composite or Glass reinforced plastic, double walled |
| 107 | Thermoelectric device (TED) | MCX470 + T, Swiftech |
| 107s | Screw (X4) | # 8 NF grade 4 |
| 107t | Threaded hole (X4) in plate 128p | # 8 NF |
| 108 | Fan | Vantec Tornado-TD8038H from www.cooltechnica.com |
| 108c | Fan power cable | 2 cond AWG 14 |
| 108h | Threaded mounting bracket hole | #8 NF |
| 108s | Screw (X4) | # 8 NF |
| 108d | Fan motor current driver | MOSFET, P ch. FDV304PCT-ND www.digikey.com |
| 109 | By-pass | Plastic |
| 109b | Air cleaner 104 to plate 103m adapter flange | Machined, fabricated, or cast metal or platic |
| 109s | Adapter mounting bolts (X3) | 5/16" NF |
| 110 | Hose connector (reinforced silicon) | 2.25" to 3.0" http://turbotech.com |
| 110a | Hose clamp | 2.25" to 3.0" www.idealclamp.com |
| 110b | Hose clamp | 2.25" to 3.0" www.idealclamp.com |
| 111 | Motor | Merkle-Korff (www.kinetekinc.com), or Xtreme Energy (www.xtreme-energy.com) |
| 111h | Mounting holes (X4) in housing 103r | 5/16" |
| 111s | bolt (X4) | 5/16" NF grade 5 |
| 111t | Threaded hole (X4) | 5/16" NF |
| 113 | By-pass outlet | 2.25" to 3.0" dia. |
| 113h | Shaft 117 mounting hole (X2 in outlet 113) | ¼" |
| 114 | Motor shaft | Hardened steel ⅜" dia. Threaded end ⅜" NF |
| 114t | Threads on shaft 114 end | ⅜" NF |
| 115 | Conditioner housing outlet | 2.25" to 3.0" dia |
| 115h | Shaft 117 mounting hole (X2 in outlet 115) | ¼" |
| 116 | Bearing (ceramic, air or magnetic | Majestic turbo www.majesticturbo.com |
| 117 | Actuator shaft | Stainless steel ¼" |
| 117h | Threaded hole (X2 plate 119, X2 plate 121) | #10 NF |
| 118 | Lock nut (blade 125 to threads 114t) | ⅜" NF, Majestic turbo www.majesticturbo.com |
| 119 | By-pass butterfly valve plate | Brass |
| 119h | Plate 119 mounting hole X2 | #10 |
| 119s | Plate 119 mounting screw X2 | #10 × ¼" brass |
| 120 | Warm air inlet (from pipe 160) | |
| 121 | Conditioner butterfly valve plate | Brass |
| 121h | Plate 121 mounting hole X2 | #10 |
| 121s | Plate 121 mounting screw X2 | #10 × ¼" brass |
| 122 | Warm air flap valve (normally closed) | Host vehicle |
| 123 | Actuator with positioning information | Type 56AA-12DC from http://www.chemline.com |
| 123c | Quick release connector signal and actuator 123 drive pair | D sub 15 pin AML15G-ND AFL15K-ND www.digikey.com |
| 123d | Actuator 123 drive cable | Belden 89731 24 AWG 6 pair high temp, oil resistant cable |
| 123q | Quick release connector pair for sensors T1 through T5 and fan 108 | HEGO type connector pair ANP-2PSC www.shonutperformance.com |
| 124 | Warm air pipe | Host vehicle |
| 125 | Turbine blade | Majestic turbo www.majesticturbo.com |
| 126 | Cable (host ECU 127 to processor 133) | AWM E148000 style 2464, 26 AWG, VW1SC ODB2 cable www.nology.com |
| 126d | Processor 133 connector (for cable 126 | RS-232 9 pin D shell female AFL09K-ND www.digikey.com |
| 126p | ODB-2 connector | 16 pin female (on host vehicle) |
| 127 | Engine Control Unit processor (ECU) | OBD-2 or CAN standards Society of Automotive Engineers |
| 128 | Exchanger | Radiator for conditioning air with thermoelectric device typically copper |
| 128h | Opening hole | Accommodates 107 and mounting holes 107t |
| 128p | Exchanger 128 top plate | copper |
| 129 | Sensor cable (T1–T5,) | Belden 89731 24 AWG 6 pair high temp, oil resistant cable |
| 129a | Sensor cable (AS) | 50'Ω coax A305-100-ND www.digikey.com |
| 129b | Advanced sensor cable 129 connector pair | BNC type ABM-1700-M ABF-1700-F www.hyperlinktech.com |
| 129i | Advanced sensor processor | Fast Fourier Transform (FFT) processor DSP TI320C55 (TI) or FPGA, ADSP-21990 (Analog Devices) |
| 129t | Sensor connector pair | D sub 15 pin AMR15G-NP AFL15K-N www.digikey.com |
| 132 | Sensor interface (analog) to processor 133p | MCP6S26 PGA w analog mux.www.microchip.com |
| 133 | Smart controller | Contained in such as housing KS142S from Rittal Company |
| 133p | Smart controller 133 processor | DSP controller w/DSP output PIC16F877 www.microchip.com |
| 133r | Real time clock | IC counter w/osc. MC74HC4060A www.digikey.com |
| 134 | Combiner | 2.25" to 3.0" thin wall steel |
| 134b | Combiner 134 by-pass input | 2.25" to 3.0" thin wall steel |
| 134c | Combiner 134 conditioner input | 2.25" to 3.0" thin wall steel |
| 134o | Combiner 134 output | 2.25" to 3.0" thin wall steel |
| 135 | Motor 111 driver | CMOS quad driver pair and HEXFET power MOSFET pair www.microchip.com |
| 137 | TED 107 driver | CMOS quad driver pair and HEXFET power MOSFET pair www.microchip.com |
| 138 | Buffer 143 to smart controller 133 data cable | RS-232 shielded cable ANC10RS www.nextag.com |
| 138b | Buffer 143 data connector | RS 232 D sub shell male AML09K-ND www.digikey.com |
| 138c | Controller 133 connector (to cable 138 | RS-232 D sub shell female AFL09K-ND www.digikey.com |
| 139 | Operator display | Plastic and rubber enclosure ABS-94HB www.pactecenclosures.com |
| 140 | Display cable | RS-232 shielded cable ANC10RS www.nextag.com |
| 140p | Processor 133p connector to cable 140 | 9 pin female-male AFL09K-ND www.digikey.com |
| 141 | Power cable battery 149 to buffer 143 | Monstercable 4 AWG 2 cond. S4GP-15 (black) + S4GP-15 |

-continued

| Number | Title | Supplier |
|---|---|---|
| 142 | Power cable buffer 143 to smart controller 133 | Monstercable 4 AWG 2 cond. S4GP-15 (black) + S4GP-15 (red) chemical and temperature resistant www.monstercable.com |
| 142b | Power connector (X4, up to 4 cables ea.) | AN-1470G1H-P www.action-electronics.com |
| 142p | Power connector (X2) cable 148 and 141 | Ring connector NY12R www.autoelectrical.com |
| 143 | Power buffer | 14 to 42 volt controller Novanta www.evolution.skf.com |
| 144 | Engine | Host vehicle |
| 144m | Exhaust manifold | Host vehicle |
| 145 | Auxiliary power | 14-42 volts battery, capacitor, or fuel cells |
| 146 | Power 145 to Buffer 143 cable | Monstercable 4 AWG 2 cond. S4GP-15 (black) + S4GP-15 (red) chemical and temperature resistant www.monstercable.com |
| 147 | Alternator (recharging) | Host vehicle 14 to 42 volts |
| 148 | Alternator 147 to Buffer 143 cable | Monstercable 8 AWG 2 cond. S8GP-15 (black) + S8GP-15 (red) chemical and temperature resistant www.monstercable.com |
| 149 | Battery (host) | 14-42 volts |
| 150 | Throttle body | Host vehicle |
| 150b | Throttle body 150 butterfly valve | Host vehicle |
| 151 | Throttle position sensor (TPS) | Host vehicle |
| 151f | Accelerator pedal | Host vehicle |
| 153 | Operation graph (warm) | FIG. 4 |
| 155 | Position of rest | Operation cycle graph |
| 156c | TED 107 drive cable controller to TED 107 | Alphawire XTRA-GUARD 87703CY 10 AWG spiral oil resistant, high heat www.alphawire.com |
| 156m | Motor 111 Drive cable controller 133 to motor 111 | Belden 10 AWG 2 conductor high temp., oil resistant cable www.belden.com |
| 156q | Cable 156m connector pair | SNP-2PSC www.shonutperformance.com |
| 156r | Cable 156c connector pair | SNP-2PSC www.shonutperformance.com |
| 157 | Period of pre-start | Operation cycle graph |
| 158 | Inlet hose (101 to 150) reinforced silicon | 2.25" to 3.0" flexible hose" http://turbotech.com |
| 159 | Period of start | Operation cycle graph |
| 160 | Exhaust pipe | host |
| 161 | Period of driving normal | Operation cycle graph |
| 162c | Combustion chamber (in host engine) 144 | |
| 162i | Intake valve (in host combustion chamber 162c | |
| 162o | Exhaust valve (in host combustion chamber 162c | |
| 163 | Period of merge (high demand) | Operation cycle graph |
| 165 | Period of resume (not high demand) | Operation cycle graph |
| 167 | Period of pass (high demand) | Operation cycle graph |
| 171 | Operation graph (cold) | FIG. 5 |
| 173 | Period of rest (cold) | Operation cycle graph |
| 175 | Period of pre-start (cold) | Operation cycle graph |
| 177 | Period of start (cold) | Operation cycle graph |
| 179 | Period of pre-normal (cold) | Operation cycle graph |
| 181 | Period of cold-normal | Operation cycle graph |
| 183 | Period of merge (cold) | Operation cycle graph |
| 185 | Period of resume (cold) | Operation cycle graph |
| 187 | Crankshaft position signal | Host vehicle |
| 189 | Vehicle speed signal | Host vehicle |
| 191 | Revolutions per minute signal (RPM) | Host vehicle |
| 193 | Manifold air pressure (MAP) signal | Pounds per square inch (psi) Host vehicle |
| 195 | Barometric pressure signal | Host vehicle |
| 196 | Chill signal line | From switch 243 to controller 215 |
| 197 | Engine coolant temperature signal | Host vehicle |
| 198 | Warm signal line | From switch 243 to controller 215 |
| 199 | Engine oil temperature signal | Host vehicle |
| 201 | Engine oil pressure signal | Host vehicle |
| 203 | Mass airflow (MAF) signal | Host vehicle |
| 205 | Throttle position signal (TPS) | Host vehicle |
| 207 | Vehicle battery voltage signal | Host vehicle |
| 208 | On/start signal | Host vehicle |
| 209 | Display connector | RS 232 D sub male-female AML09K-ND www.digikey.com |
| 211 | LCD | Toshiba 6.5" LTA065A041F www.toshiba.com |
| 213 | LCD driver | Toshiba T6965C www.toshiba.com |
| 215 | Display controller | PIC 18LF4620 www.microchip.com |
| 219 | Real time clock | IC counter w/osc. MC74HC4060A www.digikey.com |
| 221 | Display back up battery | 3.0 v lithium coin cell CR2032 |
| 223 | Communication interface controller | AMD 186CC www.amd.com |
| 225 | Input up switch | Momentary press switch SPST CKN1609-ND www.digikey.com |
| 227 | Input select switch | Momentary press switch SPST CKN1609-ND www.digikey.com |
| 229 | Input down switch | Momentary press switch SPST CKN1609-ND www.digikey.com |
| 231 | Enunciator driver | Darlington transistor array 296-16971-5-ND www.digikey.com |
| 233 | Stainless steel fender washer (X2) | #18-8 www.firmlyattached.com |
| 233t | Mounting tabs (X2) | Stainless steel loops |
| 235 | Ceramic washer (X2) | #8 JC2 www.sisweb.com |
| 237 | Stainless steel tie wire | 50 lb Duralast model 50114p www.homedepot.com |
| 239 | Sensor AS mounting hole | #8 mounted to allow sensor AS probe facing exhaust gases in manifold 144m |
| 241 | Power on/off switch | Rocker switch SPDT CKC1244-ND www.digikey.com |
| 243 | Select warm/chill switch | Rocker switch SPST CKN2052-ND www.digikey.com |
| 245 | Operating lamp | LED green 67-1119-ND www.digikey.com |
| 247 | Test switch | Momentary press switch SPST CKN1609-ND www.digikey.com |
| 249 | Alert lamp | LED red 67-1120-ND www.digikey.com |
| 251 | Nose probe on sensor AS | Stainless steel protective dome |
| 253 | Gauge bar graph | Right portion of LCD 211 software module Nelson Research www.mchipguru.com |
| 255 | SYStem access connector | USB A receptacle CCUSBA-32001-00X www.cypressindustrial.com |
| 257 | System ready lamp | LED green 67-1119-ND www.digikey.com |

-continued

| Number | Title | Supplier |
|---|---|---|
| 259 | Recharge lamp | LED amber 67-1118-ND www.digikey.com |
| 261 | Temperature display area | Upper portion of LCD 211 |
| 263 | Chill Time Available area | Lower portion of LCD 211 |
| 265 | | |
| AS | Advanced wavefront sensor | First look pulse sensor www.sentech.com |
| R1 | Current driving resistors (X4), LED circuits | 324'Ω .1 w resistor BC324XCT-ND www.digikey.com |
| R2 | Current limiting resistors (X4), momentary press circuits | 10K'Ω .1 w resistor BC10.0KXCT-ND www.digikey.com |
| T1 | Ambient temperature sensor | Thermistor BC 1485-ND www.digikey.com or thermocouple TC-61XKBEX36A www.superlogics.com |
| T2 | Intake temperature sensor | Thermistor BC 1485-ND www.digikey.com or thermocouple TC-61XKBEX36A www.superlogics.com |
| T3 | Exchanger temperature sensor | Thermistor BC 1485-ND www.digikey.com or thermocouple TC-61XKBEX36A www.superlogics.com |
| T4 | Engine intake temperature sensor | Thermistor BC 1485-ND www.digikey.com or thermocouple TC-61XKBEX36A www.superlogics.com |
| T5 | Exhaust temperature sensor | High temp thermocouple (platinum) ANSI type R www.durexindustries.com |
| Timer1 | Chill mode duration timer | Software module (down count) |
| Timer2 | Warm mode duration timer | Software module (down count) |

DETAILED DESCRIPTIONS

Figure 2:
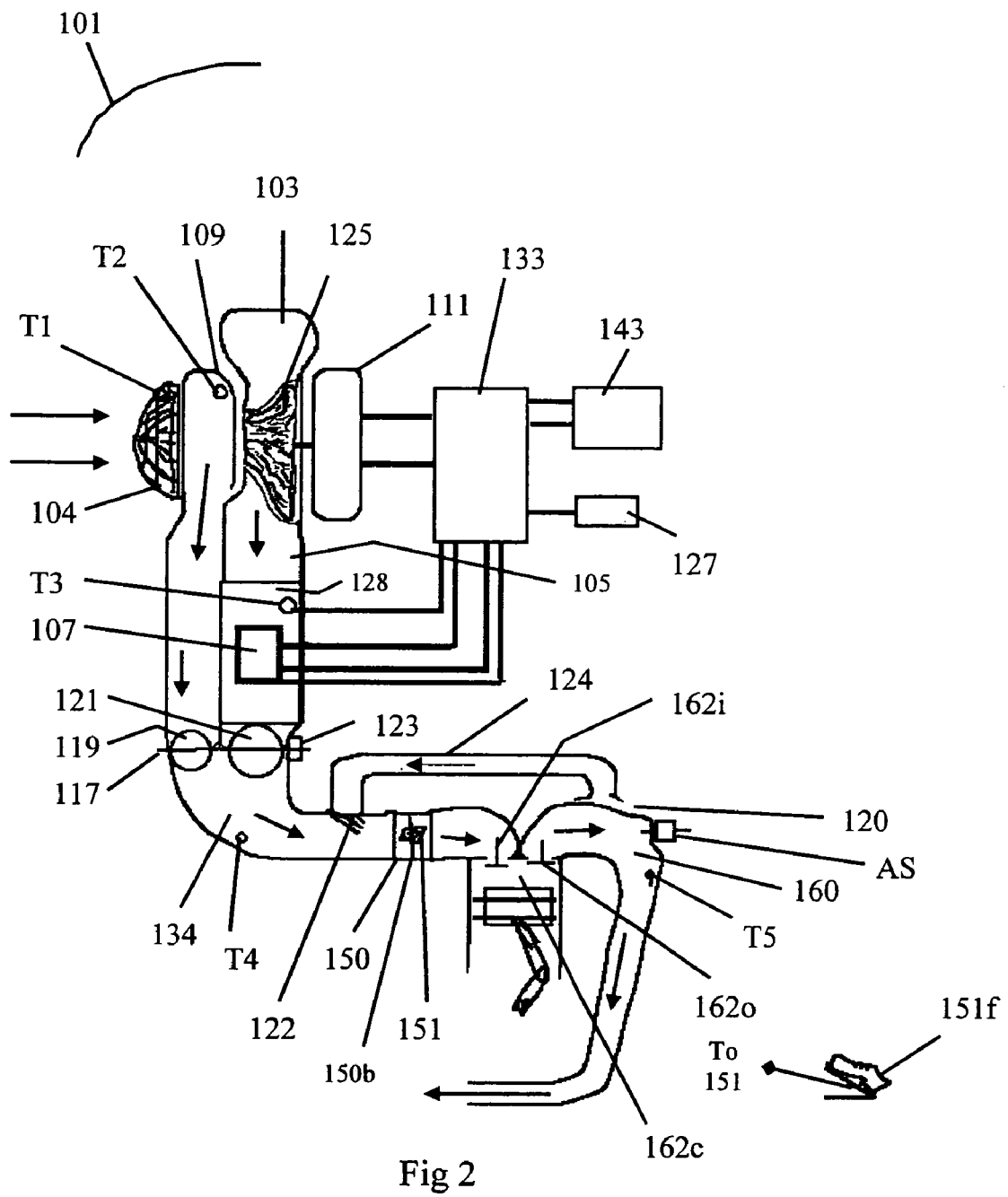

FIG. 1a is a perspective frontal view of the preferred embodiment of my invention, the On Demand Boost Conditioner (ODBC) 101 mounted in a host vehicle. The conditioner 101 is shown mounted next to the vehicle's radiator, in front of the vehicle firewall. This area of mounting conditioner 101 avoids heat soak disadvantages when compared to mounting conditioner 101 in an engine compartment behind firewall. Components of the system are shown in FIG. 2 for system perspective. Returning to FIG. 1a the conditioner 101 has an output 134o shown connected with an inlet hose 158 to a host vehicle engine 144 at a throttle body 150. The vehicle has an exhaust manifold 144m that is shown with an advanced sensor AS attached. Also shown are a vehicle battery 149, an alternator 147, an engine control unit (ECU) 126p connector, a display 139, a smart controller 133, a power buffer 143, and an auxiliary power 145. The system configuration is shown for discussion purposes as actual mounting in a vehicle may demand alternative locations when considering existing functions and weight distribution.

Figure 1B:
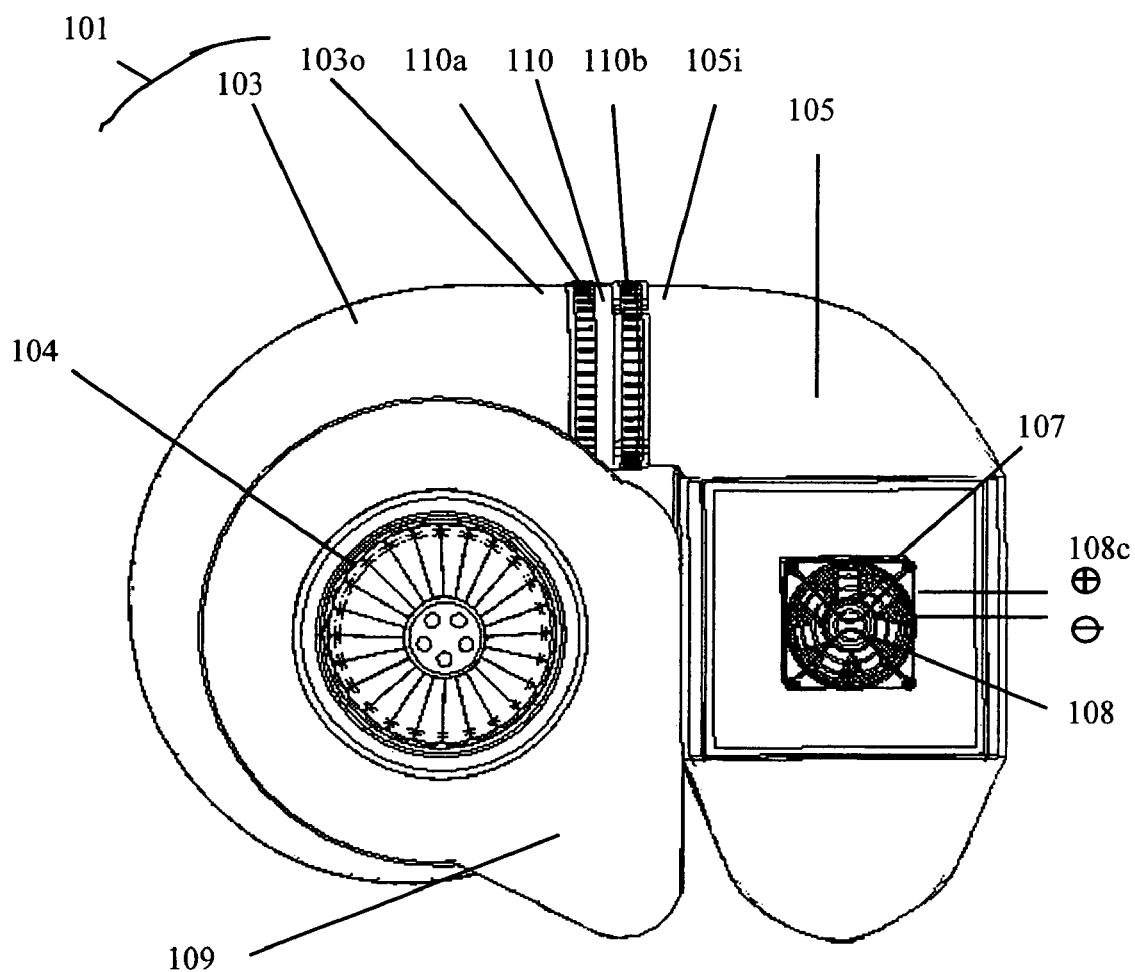

FIG. 1b is a front view of the preferred embodiment of conditioner 101. An air cleaner 104 (high flow such as type from K&N filters) filters incoming air to a by-pass housing 109 or into a turbine housing 103. The by-pass 109 enables air to enter an engine as in a normally aspirated engine. The housing 103 is the first part of the system that enables conditioner 101 to provide boosted and thermally conditioned air for combustion. The housing 103 is shown with turbine housing outlet 103o connected to a conditioner housing inlet 105i of a conditioner housing 105 by a flex hose connector 110, made of reinforced silicon sleeve of the appropriate diameter. The hose 110 is secured with a pair of hose clamps 110a and 110b. The housing 105 has an active conditioner element that is a thermoelectric device (TED) 107. The TED 107 has a fan 108 for heat transfer while stationary. The fan 108 is powered over a fan power cable 108c. This embodiment displays the housings 103 and 105 mounted together for compactness; where necessary they could also be mounted separately. Depicting TED 107 as a singular element is for discussion, multiple TED 107 elements can be implemented for adjustment of capacity and recharge time as disclosed in my ODBC system. Additionally, various intercooler (or after cooler) configurations and advanced technologies in active elements are also considered part of this ODBC system invention.

Figure 1C:
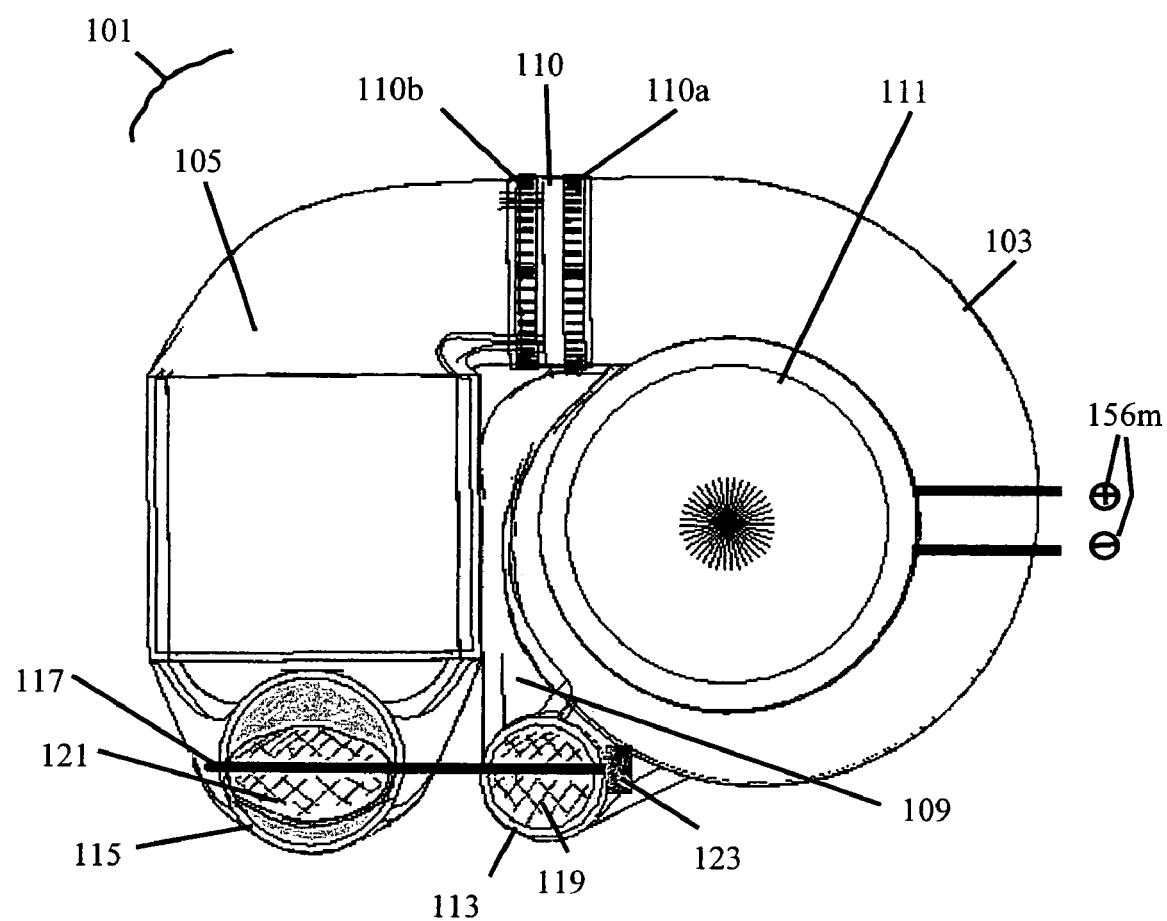

FIG. 1c is a rear view of the preferred embodiment of conditioner 101. The housing 103 is shown with a high-speed, high-torque, DC motor 111. The motor 111 is capable of being controlled by a pulse width modulation (PWM) high current driver. The motor 111 is powered over a motor drive cable 156m. The housing 105 is shown connected to housing 103 by hose 110 and clamps 110a and 110b. The housing 105 has a conditioner housing outlet 115 for release of thermally conditioned air. The outlet 115 is shown with a conditioner butterfly valve plate 121. The plate 121 is mounted to an actuator shaft 117. Also mounted on shaft 117 is a by-pass butterfly valve plate 119. The plate 119 is configured to control a by-pass outlet 113 of by-pass 109. Also connected to shaft 117 is an actuator 123. The actuator 123 responds to commands from a controller 133 (FIG. 1) to rotate shaft 117. Returning to FIG. 1c, the actuator 123 feeds back shaft 117 position information to controller 133. The plates 119 and 121 are in a normal or orthogonal orientation. This configuration allows controller 133 to direct actuator 123 to select or block output from either outlet 113 or 115, where one outlet is closed when the other is open.

Figure 1D:
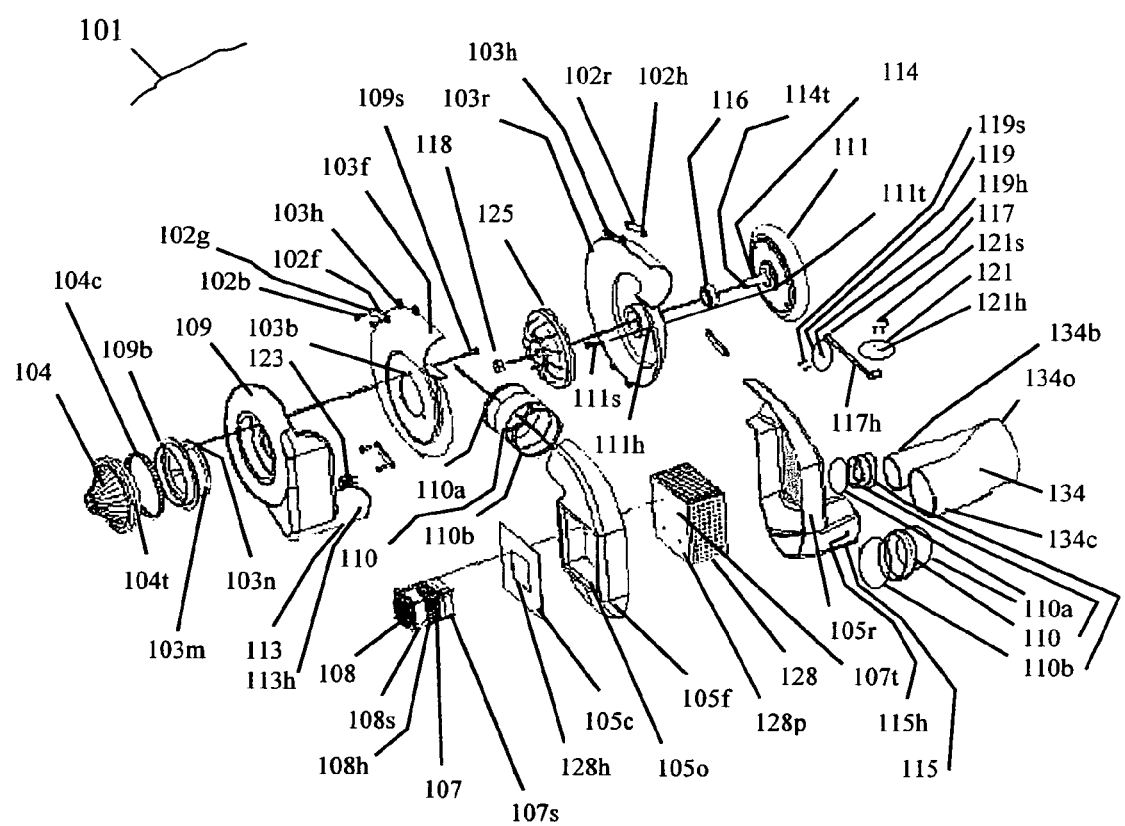

FIG. 1d is an exploded view of the preferred embodiment of conditioner 101. The motor 111 has a threaded hole 111t (X4) for mounting to a turbine rear housing 103r. A high-speed bearing 116 mounted in housing 103r supports a motor shaft 114 of motor 111. The shaft 114 has a threaded end 114t. The housing 103r has a mounting hole 111h (X4) for a bolt 111s (X4) for securing motor 111 to housing 103r. A turbine blade 125 is secured to threads 114t with a lock nut 118.

The by-pass 109 is attached to a turbine front housing 103f with a mounting plate 103m and an adapter mounting bolt 109s (X3). The plate 103m has a threaded mounting hole 103n (X3) aligned to a mounting hole 103b (X3) on housing 103f. Plate 103m has an adapter flange 109b that facilitates mounting of cleaner 104 by a hose clamp 104c securing an air cleaner throat 104t of cleaner 104 over adapter 109b. The outlet 113 connects to a combiner 134 at combiner by-pass input 134b. The by-pass 109 allows air to flow through outlet 113 into input 134b of combiner 134 as if in a normally aspirated vehicle.

Assembly of turbine housing 103 is performed after assembly of components for rear housing 103r and front housing 103f have been completed. For housing 103r, assembly steps are: insert bearing 116 in conformed recess in 103r, position shaft 114 of motor 111 through bearing 116, secure bolt 111s (X4) through hole 111h (X4) and into threaded hole 111t (X4) to secure motor 111 to housing 103r, and secure turbine blade 125 to shaft 114*t* with locking nut 118. For front housing 103*f*, assembly is as described above. Turbine housing 103 (FIG. 1*b*) is then formed by securing turbine front housing 103*f* to turbine rear housing 103*r* using a pinching brace rear backet 102*r* (X2) and a pinching brace front bracket 102*f* (X2) on top and bottom of housings 103*r* and 103*f*. The brace 102*r* contains a threaded hole 102*h* (X2) aligned with a mounting hole 102*g* (X2) in 102*f*. A threaded brace bolt 102*b* (X4) secures housings 103*r* and 103*f* by passing through holes 102*g* in brace 102*f* and seating in holes 102*h* in brace 102*r* aligned to holes 103*h* on housing 103*r* and 103*f*.

An exchanger 128 installs into opening 105*o*. The exchanger 128 has an exchanger top plate 128*p* that provides a sealing surface for housing 105*f*. The plate 128*p* has a threaded hole 107*t* (X 4) for mounting TED 107. A cover 105*c* with a TED hole 128*h* installs over exchanger 128 overlapping edges of opening 105*o* on housing 105*f*. The cover 105*c* is sealed to housing 105*f* with ultrasonic bonding or reinforced epoxy depending on housing 105*f* materials. Exchanger front housing 105*f* is joined to exchanger rear housing 105*r* with a reinforced epoxy lamination along the contours of the opening. When assembled, housing 105 should be air tight to 16 psi and exhibit minimal external heat transfer with double walled, non-heat-conductive materials. The TED 107 installs with a screw 107*s* (X4) into a hole 107*t* (X4) on plate 128*p*.

A fan 108 is mounted to TED 107 with a screw 108*s* (X4) into a threaded mounting bracket hole 108*h* (X4). The controller 133 (FIG. 1*a*) will turn on fan 108 anytime system is on and vehicle speed is below 20 mph. Returning to FIG. 1*d*, the shaft 117 is slid through holes 115*h* (X2) and 113*h* (X2) and secured to actuator 123 on the outlet 113. The plate 119 with a mounting hole 119*h* (X2) is secured to shaft 117 with a screw 119*s* (X2) into a threaded hole 117*h* (X2). The plate 121 with a mounting hole 121*h* (X2) is secured to shaft 117 when rotated 90° with a screws 121*s* (X2) into a threaded hole 117*h* (X2). The housing 105 has an outlet 115 that connects to combiner 134 at combiner conditioner input 134*c* with hose 110 and clamps 110*a* and 119*b*. Air flowing through combiner 134 exits through output 134*o*. In this configuration, conditioner 101 can provide thermal exchange to boosted air from housing 103 that travels through housing 105 containing exchanger 128, through outlet 115, and into input 134*c*. This process is an alternative to and improvement (air is boosted and thermally conditioned) upon the process of normal engine aspiration that occurs when air flows through by-pass 109 and outlet 113 into combiner 134. The outlet 113 is secured to input 134*b* with another hose 110 and clamps 110*a* and 110*b*.

Figure 1E:
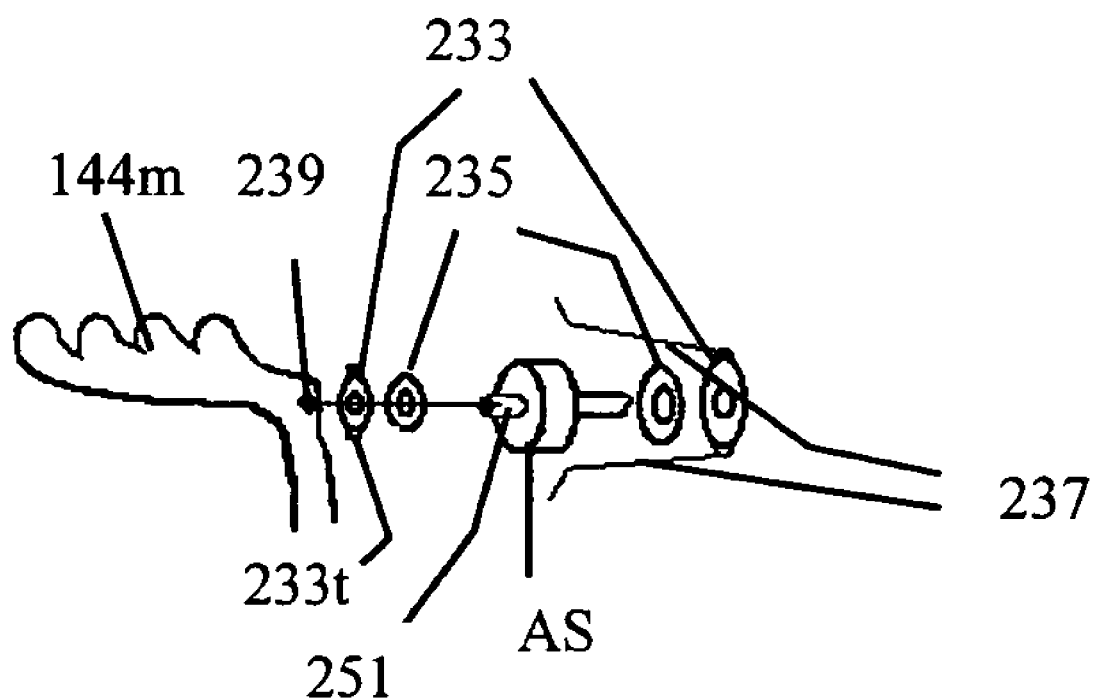

FIG. 1*e* is a blow up of mounting for advanced wavefront sensor AS. The manifold 144*m* has a sensor AS mounting hole 239 for mounting sensor AS. The hole 239 is positioned on manifold 144*m* so a probe 251 on sensor AS can directly measure wavefronts of exhaust gases. Mounting sensor AS in a curve in the manifold 144*m* allows direct wavefront exposure to minimize reflections and resulting noise. An adapter or supplemental machining may be required to establish a flat surface around hole 239 to enable sealing between manifoldl 44*m* and sensor AS mounting. A stainless steel fender washer 233 (X2) with a mounting tab 233*t* (X2) positioned on edges of washer 233 and opposing each other are provided. The tabs 233*t* can be fashioned by welding (heliarc) #12 gauge stainless steel wire to the sides of washer 233. Tabs 233*t* should be close enough to edge of washer 233 to allow an insulating ceramic washer 235 (X2) to seat undisturbed. Tabs 233*t* should be large enough to accommodate a stainless steel tie wire 237 to be threaded through and secured as with safeting (FAA AC43.13-1 B). The wire 237 should exert enough tension with equal pressure on both sides of washer 233 to seal sensor AS to manifold 144*m*. The Sensor AS is a stacked structure comprised of a piezoelectric transducer in a compressible polymer (such as silicon or urethane) sandwiched within a cover of material such as stainless steel. The sensor AS such as First Look sensor from SenX Technology is of sufficient bandwidth to capture the characteristic frequencies on the leading edge of the engine's combustion gas wave fronts.

FIG. 2 is a functional side view of conditioner 101. (Note1: Hose 158 from FIG. 1 is not shown in this figure. Note 2: In applications where the host engine compartment affords sufficient room, combiner 134 could be configured to connect directly to throttle body 150. In this application, a number of other non-material changes could occur, including: physical dimensions of 109, 103, 105 and 134 be changed to conform to available space, or an air intake hose 158 be attached on one end to cleaner 104 and extend to another location to draw in air that has not been heated by the engine compartment.) Lines with arrows depict airflow through conditioner 101. The cleaner 104 filters incoming air. A temperature sensor T1 measures the temperature of incoming air. A temperature sensor T2 measures the intake temperature of the air in by-pass 109. The difference between T1 and T2 will typically be very small; however system abnormalities such as backfire can be better characterized with the inclusion of T1 and T2 in their respective locations. For air to flow into by-pass 109 and enter combiner 134, actuator 123 positions shaft 117 to open plate 119 and close plate 121. A temperature sensor T4 measures the temperature of the intake engine air continuing through combiner 134. The sensor T4 provides data on system performance prior to exiting conditioner 101. The inclusion of sensor T4 will aide in the analysis of system performance and system problems by isolating temperature zones in the system. The combiner 134 during normal operation experiences engine vacuum that will pull air into throttle body 150 and through an intake valve 162*i* into the engine's combustion chamber 162*c*. Following combustion in chamber 162*c*, exhaust gases exit through exhaust valve 162*o* and out an exhaust pipe 160. A high temperature sensor T5 measures the temperature of the exiting exhaust gases in pipe 160. Also in pipe 160 is the wavefront sensor AS that senses fluctuations in exhaust gas wave fronts. Within a typical modern engine management system, a wide-open throttle (WOT) condition is sensed by such as a throttle position sensor (TPS) 151 when a driver presses the accelerator pedal 151*f* beyond 85%. This demand is transmitted by cable, wirelessly, or similarly to a coupling that actuates a butterfly valve 150*b* of body 150. The controller 133 monitors host signals from an engine control unit (ECU) 127. The controller 133 is powered by power buffer 143. Among its functions, the controller 133 energizes TED 107 to condition exchanger 128 to chill or warm. The controller 133 monitors exchanger 128 temperature with a temperature sensor T3. The controller 133 also controls the motor 111. The controller 133 monitors motor 111 speed with internal signal processing. When controller 133 senses WOT true from ECU 127, timer1 (software) is set to 30 seconds, all critical engine parameters are checked, and, when no abnormal parameters are present, 133 commands actuator 123 to move shaft 117 to open plate 121 and close plate 119. This action closes by-pass 109 at plate 119 and opens airflow through housings 103 and 105 and into combiner 134. The controller 133 having already conditioned exchanger 128 through action of TED 107 will turn off or sequence operation of TED 107 to minimize current draw during this high demand condition. The blade 125 is now exposed to incoming air via action of actuator 123 to open plate 121. The controller 133 commands motor 111 to "spin-up" blade 125 to accomplish full boost. Boosted air from housing 103 travels into housing 105 containing exchanger 128. While proceeding through exchanger 128, air is thermally conditioned. During WOT conditions boosted air is "chilled" by the exchanger 128. The sensor T3 monitors temperature of exchanger 128. The controller 133 monitors sensor T3 to determine current needs of TED 107 to condition exchanger 128. Boosted and conditioned air continues past plate 119 into combiner 134. The sensor T4 monitors the temperature of air in combiner 134. The boosted and chilled air continues into body 150 (wide open) past valve 162$i$ and into chamber 162$c$ for combustion. This boosted and conditioned air is combusted in chamber 162$c$ and exits past valve 162$o$. These exhaust gases are expelled through pipe 160 where temperature is monitored by sensor T5 and combustion wave fronts are sensed by sensor AS.

The controller 133 will check WOT signal ten times a second. When WOT is no longer true or time out occurs in timer1, typically 30 seconds, controller 133 will shut motor 111 down and command actuator 123 to move shaft 117 to close plate 121 and open plate 119 allowing normal (low demand with no boost or conditioning) operation.

Warm start up and operation (cold cycle) air is available when sensor T1 tells controller 133 that ambient air is below 50° F. and ECU 127 registers engine temperature below normal operating temperature (typically 170° F.). The Cold cycle pre-start is initiated by driver turning on ODBC by pressing rocker switch 241 FIG. 6 to on, at which time (following above checks), returning to FIG. 2 controller 133 commands TED 107 to warm exchanger 128 to 80° F. When engine start cycle is initiated, controller 133 turns off TED 107 to minimize power drain during this high demand situation. (If auxiliary power 145 is present, controller 133 commands TED 107 to continue operation to warm condition 128. Absent auxiliary power, controller 133 will command TED 107 to warm condition 128 when engine start is accomplished.) The controller 133 will command actuator 123 to position shaft 117 to close plate 119 and open plate 121 to allow air flow through housings 103 and 105. The motor 111 will be commanded by controller 133 to spin at a low rpm (typically 30% of full rpm speed) to facilitate airflow through exchanger 128. The exchanger 128, having been pre-heated, warms air as it flows through exchanger 128. Warmed air will continue past open plate 121 through combiner 134, through body 150, and into a normal combustion cycle. Once start of engine has been accomplished, controller 133 will re-enable TED 107 to condition exchanger 128 to keep air supply warm until sensor T5 registers threshold (typically~85°) temperature with controller 133. Then controller 133 will shut down TED 107 and command actuator 123 to position shaft 117 for normal operation with plate 119 open and plate 121 closed so that air flows through bypass 109 and into combiner 134. (Additionally, when ECU senses lower than normal operation temperature, thermal flap valve 122 that is normally closed will open. The valve 122 when open will allow air warmed by pipe 160 to enter warm air tube 124 at inlet 120 and assist in engine warming. This condition can continue until engine normal operational temperature (typically~170° F.) is reached and valve 122 is closed.) An engine with this configuration in a cold climate will experience warm air through out cold start and operation cycle. This "conditioned" air will minimize start time and improve combustion during initial cold operation (signal 197). In addition to reduced emissions and improved fuel economy, engine wear is reduced. Cold start is the most vulnerable time for an engine as fuel that is not combusted can foul lubrication oil causing chemical breakdown and scratching to moving parts. These conditions contribute to premature wear and failure.

Figure 3A:
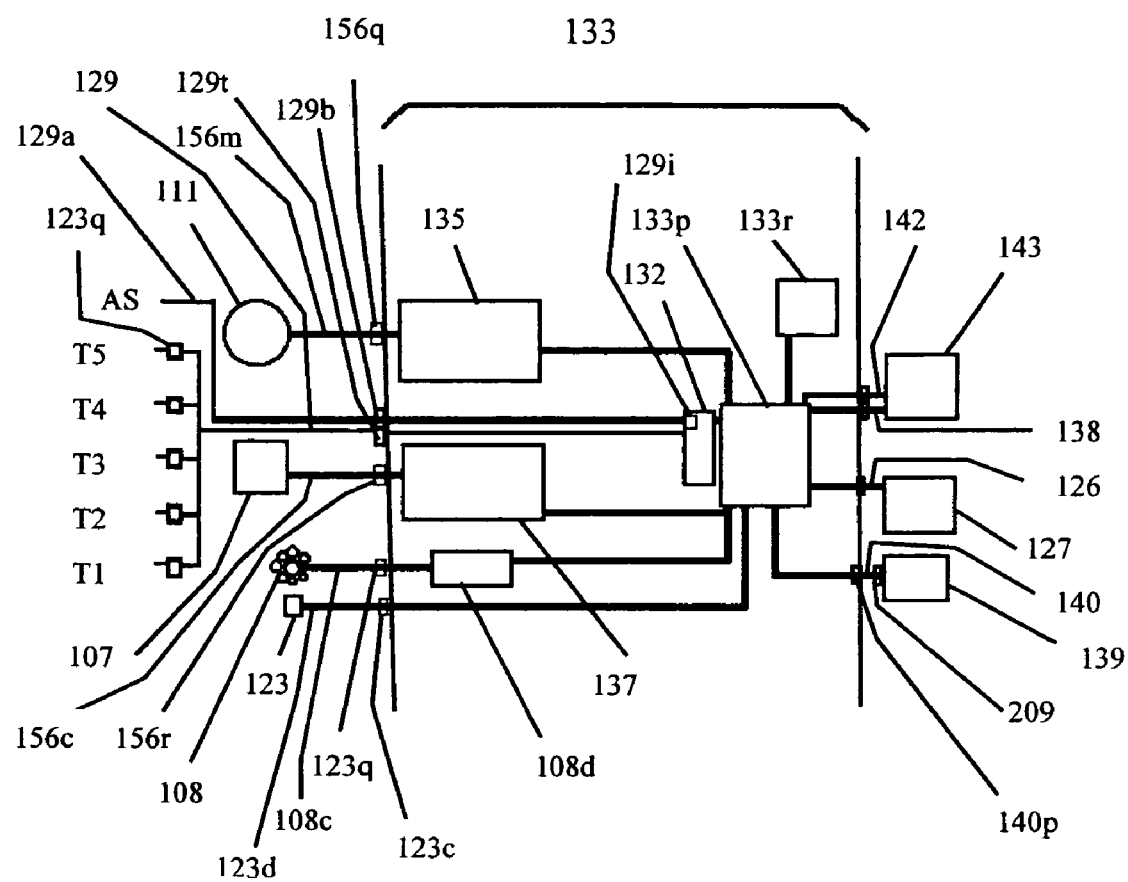
Figure 3B:
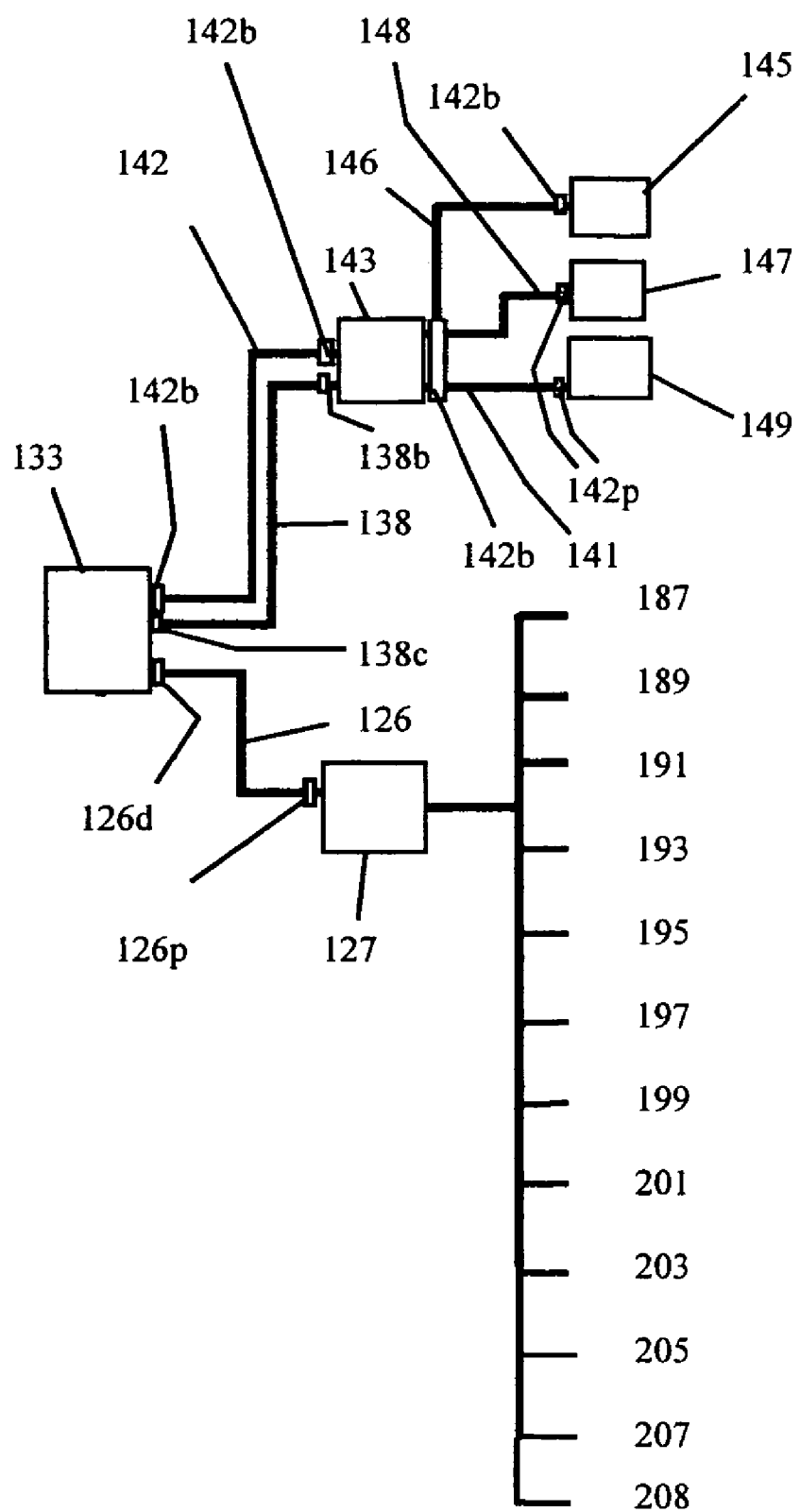

FIG. 3$a$ discloses basics of controller 133. The heart of controller 133 is a DSP processor 133$p$. The processor 133$p$ is a multi-function processor with sensing, processing and controlling capabilities such as a PIC 16 F877 from microchip (www.microchip.com). The processor 133$p$ monitors system components and receives system data and host vehicle data inputs, and, using software to combine this information with resident tables from known hazardous conditions, previous operations and host vehicle operating specifications, executes system control functions. Operating and hazardous condition data are stored as values in look up tables, allowing processor 133$p$ to perform rapid compares to current values simplifying identification of or absence of critical values and notification to ECU 127 when a condition (value) is detected. A real time clock 133$r$ provides timing and synchronization capabilities. The controller 133 is housed in rugged plastic enclosure KS 1423 from Rittal company (www.rittal.co.uk). A sensor interface 132 is provided for amplification and conversion of sensor signals T1 through T5. These sensors collect the following data: sensor T1 measures ambient air temperature, sensor T2 measures by-pass 109 intake air temperatures, sensor T3 measures exchanger 128 (FIG. 2) temperature, sensor T4 measures output air temperature in combiner 134, sensor T5 measures exhaust air temperature, and sensor AS monitors integrity of combustion gas wavefronts. Interfacing sensor AS is an analog to digital (A to D) converter front end device with a Fast Fourier Transform (FFT) processor 129$i$. As signal analysis must be accomplished before a cylinder fires again the processor 129$i$ provides FFT solution in hardware to minimize time for frequency content analysis from sensor AS to processor 133$p$. A data cable 129 provides connection of interface 132 to T1 through T5. A quick release pair of connectors 123$q$ (X5) are provided for where box icons are indicated at sensors T1 through T5. A sensor connector pair 129$t$ facilitates connection and quick release of cable 129 to controller 133. The controller 133 monitors system components and receives system data inputs from host ECU 127 over cable 126, and, using software to combine this information with resident tables from previous operations and host vehicle operating specifications, executes system control functions. A coax instrumentation cable 129$a$ connects sensor AS to processor 129$i$. A cable pair connector 129$b$ connects and facilitates quick release for cable 129$a$ circuitry. The processor 133$p$ has a look up table stored in memory with previously quantified signals from engines with anomalies. These anomalies include data on conditions such as, but not limited to: contaminated fuel, excessive spark advance, excessive combustion chamber temperature, and no spark. The quantified signal information processor 129$i$ analyzes signals from sensor AS and sends quantified data to processor 133$p$ for comparison to data stored in look up tables. When processor 133$p$ determines that a condition comparable to an anomalous condition is present an alert signal will be sent to display 139. On systems equipped with OBD-2 or CAN, timing can be retarded or advanced as required. Similar adjustment techniques can be taken with intake air boost levels, fuel enrichment, and valve timing. The processor 133$p$ is capable of sufficient processing speed to evaluate conditions and identify a cylinder in subject engine causing an anomaly before that cylinder fires again. By sensing from sensor AS, processing in processor 129*i*, reporting to processor 133*p*, reporting to ECU 127, and adjusting spark advance, or other values discussed above, controller 133 can mitigate or avert potentially catastrophic or problematic combustion conditions. The display 139 provides system interface and control. A data interface display cable 140 connects display 139 to processor 133*p*. To simplify installation and removal, cable 140 has connector pair 140*p* at processor 133*p* and connector pair 209 at display 139. A pair of high current PWM drivers are provided for motor 111 and TED 107. A driver 135 is configured for operation and control of motor 111 over a motor drive cable 156*m*. A cable connector pair 156*q* is provided for installation and quick release of cable 156*m* circuitry. A driver 137 is configured for operation and control of TED 107 over a drive cable 156*c*. A cable connector pair 156*r* is provided for installation and quick release of cable 156*c* circuitry. The drivers 135 and 137 consist of drivers such as contained in "Brushless DC Motor Control Made Easy," Ward Brown. The driver 135 receives PWM control signals from processor 133*p* and instructs motor 111 to a specific rpm and monitors back electromagnetic force (BEMF) from motor 111. The measured BEMF is transmitted to processor 133*p*, and compared to the applied voltage and the specified rotor speed and position can be determined. The effective applied voltage can be varied with PWM and the speed of motor 111 by timing the commutation phases. A short software routine in processor 133*p* will handle PWM and commutation, and a state table will schedule reading peak applied voltage and BEMF voltages at two times per cycle. The driver 137 receives PWM control signals from processor 133*p* and energizes TED 107 to chill or warm. The sensor T3 monitors exchanger 128 (FIG. 2) temperature and provides this information over a sensor cable 129. Processor 133*p* uses sensor T3 information to instruct driver 137 how much effective power should be applied to TED 107 by PWM to reach, sustain, or change to affect the temperature of exchanger 128. A fan motor driver 108*d* is provided for control of fan 108. The fan 108 receives power from driver 108*d* through cable 108*c*. Processor 133*p* will activate the fan 108 whenever conditioner 101 is on and vehicle speed (FIG. 3*b*, signal 189) is below 20 mph. The actuator 123 is connected to controller 133 over actuator drive cable 123*d*. A quick release connector signal and actuator 123 drive pair 123*c* at actuator 123 facilitates connection and quick release of the actuator cable 123*d* circuitry. The power buffer 143 receives and transmits data over a cable 138 and distributes power to processor 133*p* over power cable 142. The ECU 127 is connected over cable 126 (OBD-2 to RS 232 cable from www.nology.com) to processor 133*p* inside controller 133.

FIG. 3*b* discloses a controller 133 connections over cable 126 to ECU 127 and critical inputs from host system. A signal 187 provides engine crankshaft position. A signal 189 supplies vehicle speed. A signal 191 provides engine RPM. A signal 193 provides manifold air pressure (MAP). A signal 195 provides barometric pressure. A signal 197 provides engine coolant temperature. A signal 199 provides engine oil temperature. A signal 201 provides engine oil pressure. A signal 203 provides mass airflow (MAF). A signal 205 provides throttle position from throttle position sensor 151 (shown in FIG. 2). Returning to FIG. 3*b* signal 207 supplies battery voltage data. A signal 208 indicates an on/start command is true. A connector 126*p* connects cable 126 to ECU 127. A connector 126*d* connects cable 126 to controller 133. The controller 133 collects and monitors the above data signals and compares and tracks values relative to demand indicated by throttle position signal 205 and relative to the stored values in system memory.

The controller 133 will evaluate system status from ECU 127 and control the system state (FIG. 4 and FIG. 5) to implement system action in response to driving demands reported by signal 205, the throttle position sensor 151. Returning to FIG. 3*b* the controller 133 connects to power buffer 143 over a cable 142 for power and over the cable 138 for data. A connector 138*b* connects cable 138 to buffer 143. A connector 138*c* connects cable 138 to controller 133. A connector 142*b* (X2) connects cable 142 to buffer 143 and controller 133. The buffer 143 can receive auxiliary power 145 over a power cable 146. A power connector 142*b* connects cable 146 to power 145. The power 145 can be any source of storage sufficient to supplement primary system power for TED 107 and fan 108 when host vehicle system power must be devoted to non-conditioner 101 high demand situations such as engine starting and where controller cannot continuously run or sequence actions of TED 107 and fan 108 because concurrent conditioner 101 demands would overload host vehicle power system and controller 133 must shut down TED 107 and fan 108 to protect host vehicle. A typical power 145 is compatible with 42v standards (ISO 21848) or any efficient storage system that buffer 143 can utilize while maintaining compatibility with host system power parameters. A host vehicle alternator 147 is shown for recharging power 145. Recharging occurs over a cable 148 that connects alternator 147 to buffer 143 and over cable 146 that connects buffer 143 to power 145. A power connector 142*p* connects cable 148 to alternator 147. The buffer 143 supplies a voltage step-up to recharge power 145. A host vehicle battery 149 is shown connected to buffer 143 over a cable 141. A connector 142*p* connects cable 141 to battery 149. Power cables 146, 148 and 141 are connected to buffer 143 at a terminal connector 142*b*. The battery 149 can be 12 volt to 42 volt with proper configuring of buffer 143. The buffer 143 will monitor voltage levels for vehicle battery 149, alternator 147, and auxiliary power 145. The buffer 143 will supervise recharging and level conditions and inform controller 133 and operator display 139 (FIG. 6). A system can be configured without power 145 where controller 133 either shuts down TED 107 and motor 111 or sequences their actions when data from ECU 127 on battery current drain and alternator recharge status is compared to data on previous operations and host vehicle specifications stored in processor 133*p* memory indicates that continued operation of TED (107) and motor 111 could impose unsafe operating conditions on battery 149 and alternator 147 during high-demand operation periods. Although batteries and voltage levels are discussed fuel cells or capacitors such as Ultracapacitor from Maxwell or similar storage device are appropriate to ODBC applications.

Figure 4:
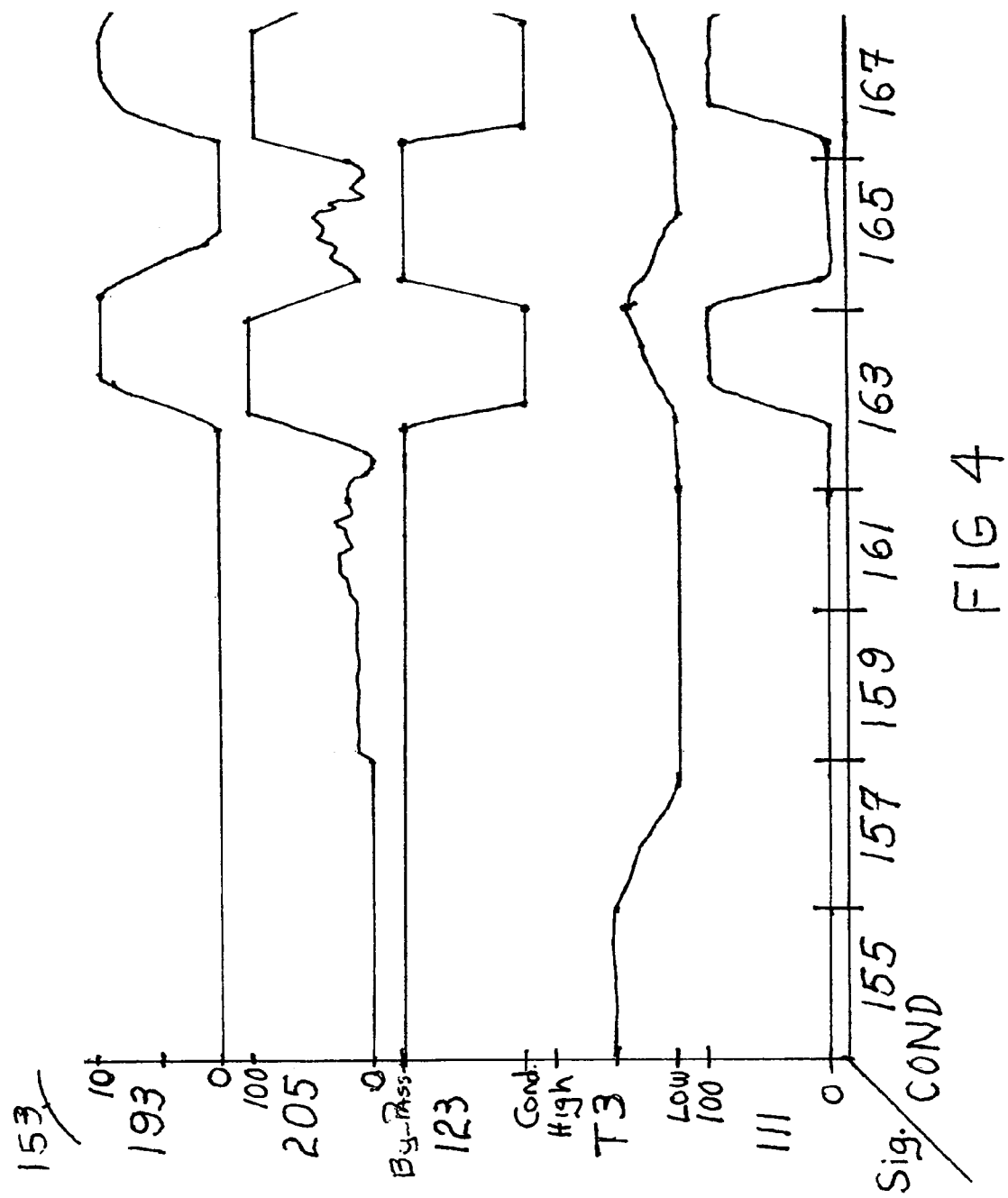
FIG. 4 is a time line sequence for normal operation of my conditioner.

FIG. 4 discloses a time line of conditioner 101 operation and functional sequencing in graph 153. The graph 153 "y" axis has five signals with the following values or states: signal 193 (manifold air pressure from ECU 127) is displayed with a range of 0 to 10 pounds per square inch (psi), the signal 205 (throttle position sensor from ECU 127) is shown with a range of 0 to 100% actuation to report the position of TPS 151, the values of 123 represent actuator 123 orientations shown with by-pass (plate 119 open, FIG. 2) or conditioner (plate 121 open, FIG. 2) selected, returning to FIG. 4 the T3 values report the temperature of conditioner 128 measures by sensor T3 with values ranging from warm to cold. The motor 111 speeds are displayed at the bottom of the "y" axis showing a range of 0 to 100% RPM.

The graph 153 "x" axis displays events or operational periods in a time sequence. A period of rest 155 begins a typical conditioner 101 cycle. During rest 155, signal 193 is normally at zero psi or no boost. Also during rest 155, signal 205 is normally at 0% actuation. Also during rest 155, actuator 123 normally reflects that conditioner 101 is set for by-pass Also during rest 155, sensor T3 normally is at ambient temperature, between warm and cold. Additionally, during rest 155, motor 111 is normally off.

A period of pre-start 157 follows rest 155. The pre-start can be entered by selecting on with switch 241 (FIG. 6) or turning host ignition to "on." And ECU 127 will signal controller 133 to enable ODBC. During pre-start 157 and during normal operation where ambient temperatures exceed 50° F., controller 133 will direct TED 107 to pre-chill exchanger 128 and sensor T3 will transition to cold. During pre-start 157, other signal and sensor parameters will remain unchanged.

A period of start 159 is shown next. The start 159 will see signal 205 changes as driver commands throttle to open to enable combustion. Little or no change in sensor T3 should be seen with adequate insulation on housing 105 (FIG. 1d) and plate 121 (FIG. 2) is closed although TED 107 is turned off during start 159 (when auxiliary power is not available). A period of driving normal 161 is shown next. During normal 161, with normal ambient temperatures (over 50° F.) and an engine at normal operating temperature, little is changed. The signal 205 during normal driving period 161 will show small and varied demands reflecting small driving variations. The sensor T3 will remain chilled during normal driving period 161 through housing isolation and recharging from driver 137 (FIG. 3a) when controller 133 directs TED 107 to continue to condition exchanger 128.

A period of merge 163 is shown next where high demand is commanded. The period of merge 163 is initiated when signal 205 from ECU 127 indicates high demand on throttle from TPS 151. A number of actions occur following signal 205 approaching 100%. The smart controller 133 will command motor 111 to spin up to full rpm. The controller 133 also commands conditioner 101 to change to conditioner state according to state 123 (plate 121 open, plate 119 closed, FIG. 2). As motor 111 spins up, signal 193 will report movement to full boost. An OBDC 101 without auxiliary power will shut off TED 107 (FIG. 2) during period 165 (if controller 133 cannot sequence TED 107 operations without parasitic effect on host vehicle power), and T3 will indicate warming as a greater amount of exchanger 128 cold reserve is dissipated by transfer to air entering housing 105. If auxiliary power 145 is available, TED 107 will be continuously charged during merge 163 and sensor T3 will not show as rapid dissipation of exchanger 128 cold reserve. Upon completion of high demand operation, the following events are reported: TED signal 205 drops as TPS 151 reports closing motion of throttle butterfly 151b, signals 193 and 111 drop as signals report motor 111 shut down, signal for actuator 123 reports controller 133 commanding actuator 123 to close outlet 115 and open outlet 113, and sensor T3 reflects higher temperatures resulting from the discharge of thermal energy from conditioner 128. A period of resume 165 is shown where high demand has ended. All values are in a steady state condition with signal 205 displaying slight variations as in normal driving and sensor T3 building up a reserve for the next demand period.

A period of pass 167 is shown next where high demand is again commanded. The period of pass 167 initiates with signal 205 moving towards 100% as ECU 127 indicates high throttle demand from TPS 151. A number of actions occur as signal 205 approaches 100%. The controller 133 (FIG. 2) will command motor 111 to spin up to full rpm and signal 111 shows increased RPMs. As motor 111 spins up, signal 193 will show increasing boost, as the signal for actuator 123 shows controller 133 commanding actuator 123 to conditioner open state (this will select conditioner outlet 115 and close by-pass 113 FIG. 2). As in merge 163, what sensor T3 reports of exchanger 128 temperature reserve reflects commands of controller 133 to TED 107 to continue charging exchanger 128 to cool, which depend on presence of power 145. In the absence of power 145, controller 133 will, consistent with protection of host vehicle power system, either shut down TED 107 or issue sequenced commands to TED 107 to recharge exchanger 128 to cool, with the most rapid sequencing possible sought by controller 133 in light of input from ECU 127 reflecting battery 149 conditions and alternator 147 conditions. In that case sensor, T3 will report more rapidly rising temperatures of exchanger 128 than would be reported by sensor T3 if auxiliary power 145 were present to enable TED 107 to continuously recharge exchanger 128. When pass 167 is completed, signal 205 drops to reflect reduced throttle demand, motor 111 is shut down, conditioner 101 reverts back to normal operation with signal 123 showing bypass selected and conditioner closed, signal 193 reflects boost drop to zero, and sensor T3 reflects a period of recharge. A second resume 165 will follow pass 167 (not shown). Signals will normally remain in this configuration until another demand is commanded or system is turned off.

Figure 5:
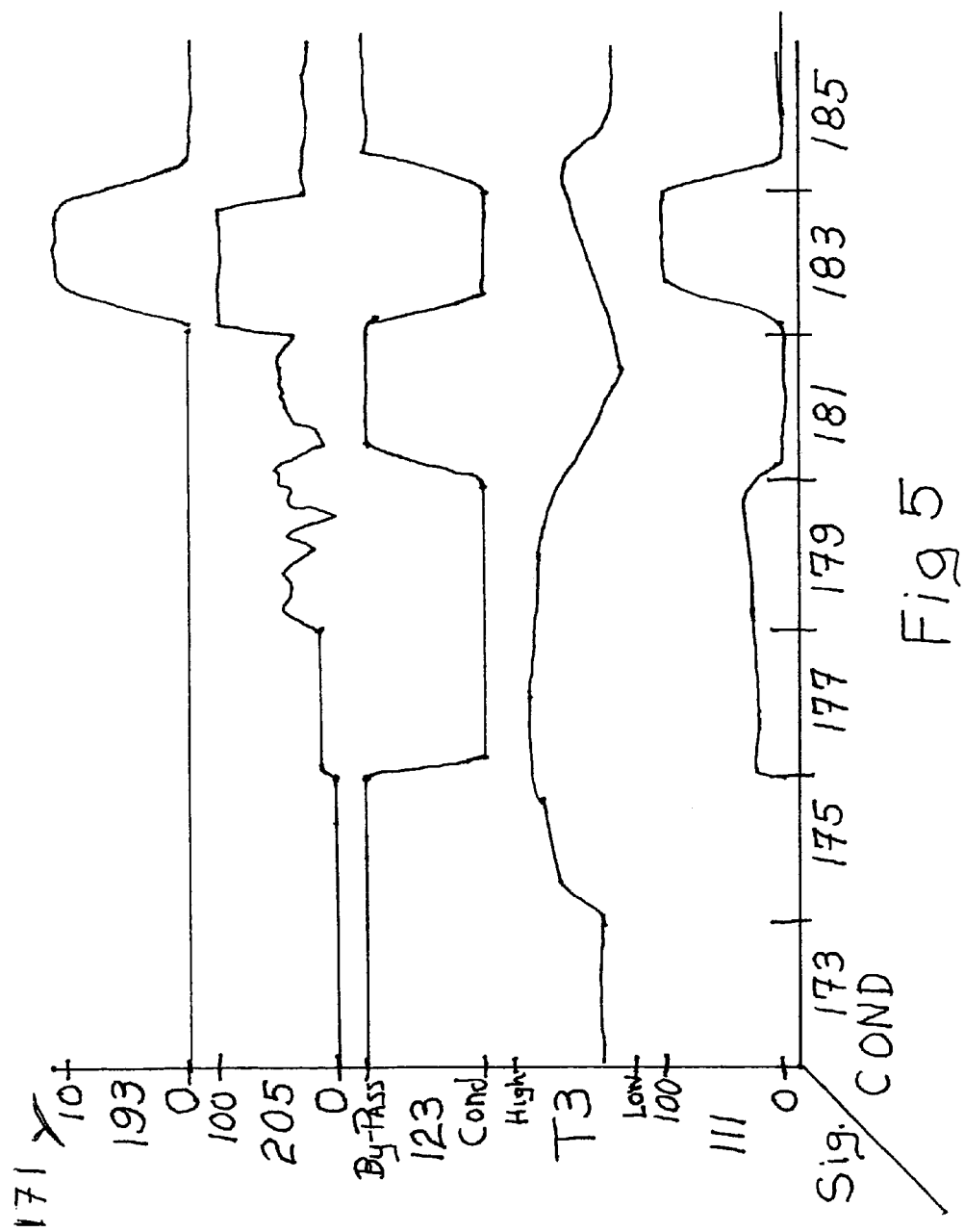
FIG. 5 is a time line sequence for warmer operation of my conditioner.
Figure 6:
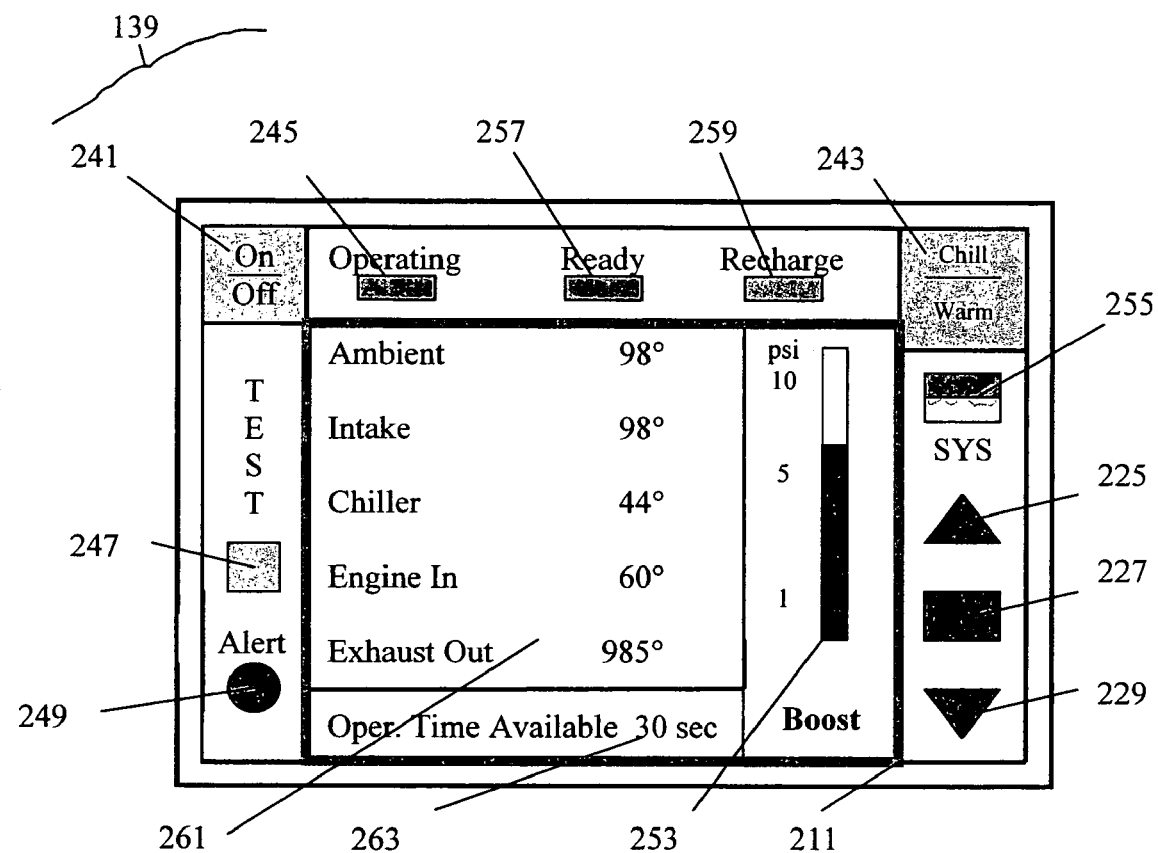
FIG. 6 is an interface operator screen for my conditioner.

FIG. 5 discloses a time line of conditioner operation and functional sequencing during cold operation on graph 171. A "cold" operation is expected to be anytime the ambient temperature falls below 50° F. During these conditions internal combustion engines are difficult to start and perform poorly until the engine reaches operational temperature. Classical solutions include vent tubes from exhaust. These solutions will not work until the engine has run for a number of minutes. The discussion that follows supplements those systems to address cold start and initial operation impacts on the host vehicle engine. The graph 171 "y" axis depicts 5 signals, (which are the same as in FIG. 4), "y" axis has five signals with the following values or states: signal 193 (manifold air pressure from ECU 127) is displayed with a range of 0 to 10 pounds per square inch (psi), the signal 205 (throttle position sensor from ECU 127) is shown with a range of 0 to 100% actuation to report the position of TPS 151, the values of 123 represent actuator 123 orientations shown with by-pass (plate 119 open, FIG. 2) or conditioner (plate 121 open, FIG. 2) selected, returning to FIG. 5 the T3 values report the temperature of conditioner 128 measures by sensor T3 with values ranging from warm to cold. The motor 111 speeds are displayed at the bottom of the "y" axis showing a range of 0 to 100% RPM.

The graph 171 "x" axis displays events in a time sequence. A period of low temperature rest 173 is depicted. During rest 173, signal 193 reports 0 psi. Also during rest 173, signal 205 is at 0%. During rest 173, conditioner 101 is set for by-pass 109 operation. Different during rest 173, sensor T3 reports cold ambient temperatures. During rest 173, motor 111 is at 0 rpm. The next period is cold pre-start 175 initiated by driver engaging rocker switch 241 (FIG. 6) to on position with switch 243 selecting "Chill" or by driver engaging host vehicle ignition to on position where ECU 127 reports to processor 133 signal 209 on is true. During pre-start 175, all signals and devices remain unchanged with the exception of signal from sensor T3. During pre-start 175, processor 133 will sense low ambient temperature on sensor T1 and command TED 107 to warm exchanger 128 (all in FIG. 2) to 80° F. During pre-start 175, sensor T3 will reflect a rising temperature of exchanger 128 during preparation for assisting in improved starting of host engine. The processor 133 will continue to command TED 107 to warm sensor T3 until start is initiated or system is turned off.

A cold start 177 period follows. During start 177, motor 111 is spun up to low rpm to facilitate airflow through exchanger 128. Controller 133 will command actuator 123 to set conditioner 101 for conditioner operation (plate 113 closed and plate 115 opened (FIG. 2)). The signal 193 will exhibit about a 20% increase in pressure from motor 111 spinning turbine blade 125 (FIG. 2), and the resulting conditioned airflow will give the cold host engine warmer than ambient temperature air to improve combustion and minimize start time and difficulty. During start 177, if system does not feature power 145, smart controller 133 will shut down or sequence TED 107, consistent with safe operation of host vehicle electrical system and battery 149. During start 177, sensor T3 will report cooling of exchanger 128 as thermal energy is transferred to air, but less thermal energy will be lost in a system equipped with power 145.

When engine achieves ignition and reaches idle, a period of cold pre-normal 179 is entered. All conditions are initially kept as in start 177 except TED 107 is re-enabled or run continuously on non-auxiliary powered systems and signal 205 reflects typical driving requirements. The pre-normal 179 operation will continue until sensor T5 informs processor 133 that exhaust temperature is sufficiently high (based on host vehicle requirements, frequently over 100° F.) to warm incoming air via operation of valves 120 and 122 and pipe 124 (FIG. 2). When this occurs a cold-normal 181 operation period is entered. The cold-normal 181 period has air warmed by host vehicle's pipe 160 (FIG. 2), and supplemental action by ODBC can cease.

During cold-normal 181, the following changes occur: signal 193 will remain at 0, actuator 123 will reflect conditioner 101 in by-pass operation with conditioner closed, motor 111 signal will report drop to 0, and signal 205 will reflect normal driving operation of TPS 151. Additionally, sensor T3 will indicate the transition to cold in preparation for future demand driving. An operation period where traffic demands require additional power, merge 183 is shown.

A period of cold merge 183 is shown next where high demand is commanded. The period of merge 183 shows signal 205 going to 100% to indicate a full throttle demand situation. A number of actions occur following signal 205 transitioning to 100%. The controller 133 (FIG. 2) will command motor 111 to spin up to full rpm. The controller 133 commands actuator 123 to set valves for conditioner operation. As motor 111 spins up signal 193 will approach full boost. A system without auxiliary power will shut off or sequence TED 107 during this period and a greater amount of sensor T3 cold reserve will be dissipated during merge 183. If auxiliary power is available TED 107 will be continuously charged during merge 183 and sensor T3 will reflect less cold reserve dissipation. Upon completion of high demand operation signal 205 drops and motor 111 is shut down, conditioner 101 reverts to normal operation with by-pass selected and conditioner closed, signal 193 drops to zero, and sensor T3 reflects a period of recharge. A period of resume 185 is shown where high demand has ended. All values are in a steady state condition with signal 205 displaying slight variations and sensor T3 building up a reserve for the next demand period.

Figure 7:
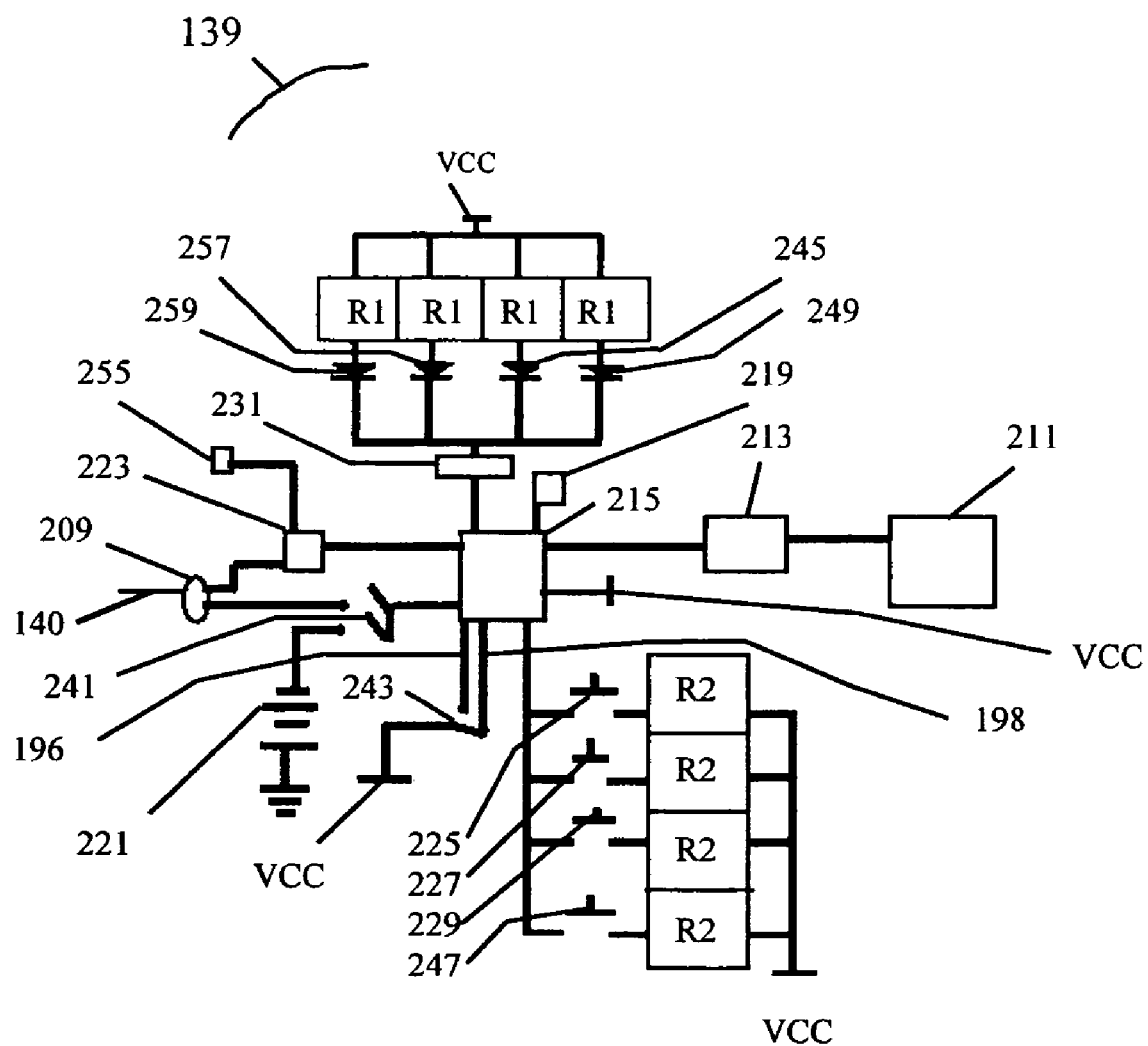
FIG. 7 is a block diagram of the operator screen of my conditioner.

FIG. 6 discloses details of display 139 for monitoring and controlling this embodiment of conditioner 101. The display 139 consists of an LCD 211 surrounded by a perimeter of inputs and outputs. The LCD 211 is an alpha numeric with graphics display. The values and operational information reported in display 139 are reported by processor 133p (FIG. 3a) and updated constantly during operation to display 139 over cable 140 (FIG. 3a). Returning to FIG. 6 a temperature display area 261 displays temperatures reported by sensors T1 through T5 with numerical values that are constantly updated during operation. (blinking 888 indicates sensor problem) An area 263 below area 261 displays a value for "Oper. Time Available" to the right in seconds. To the right of areas 261 and 263 is a bar graph 253 of the current boost level. The graph 253 comes from a software package module from Nelson Research that is compiled into run time environment and loaded into display processor (FIG. 7). Returning to FIG. 8 to the left and above LCD 211, a rocker switch 241 provides power on and off function for conditioner 101. To the right and above LCD 211 another rocker switch 243 allows an operator to manually select warm or chill modes to direct action by TED 107 on conditioner 128, such as in pre-start cycles (FIGS. 4 and 5). Returning to FIG. 6 below switch 241, a momentary press switch 247 (below TEST label) initiates test functions. During test mode, controller 133 will read all sensors and perform operability tests. Successful test results will be reported by an operating lamp 245 flashing green to inform operator of normal operational status. If controller 133 encounters any problems, a red alert lamp 249 will flash. The lamp 249 will also flash if oil temperature or pressure (signal 199 and signal 201, both FIG. 3b) are out of safe operation range. Returning to FIG. 6 additionally, lamp 249 will flash if sensor AS (FIG. 2) detects abnormal combustion. Returning to FIG. 6A ready indicator lamp 257 (green) will illuminate when conditioner 101 is ready for conditioning operation. A recharge indicator lamp 259 (amber) will illuminate when conditioner 101 is recharging and not ready for conditioning operation. A system interface connector 255 (USB connector) is labeled SYS(tem). The connector 255 allows operator data interface and bi-directional loading of ODBC system. Operator selection and entry are provided by input select switch 227, input up switch 225, and input down switch 229.

FIG. 7 discloses a block diagram of display 139 functions. The switch 241 is shown with double poles to enable system power (VCC) from cable 140 through connector 209 or back up battery 221. The switch 243 is shown selecting either a chill signal line 196 or a warm signal line 198 from VCC to a display controller 215. The cable 140 through connector 209 also connects to communications interface controller 223. The controller 223 will receive and transmit data and signals to controller 215 from processor 133p (FIG. 2), returning to FIG. 7, over cable 140 and external data over connector 255. An enunciator driver 231 is provided to drive display lamps (LEDs). A current driving resistor R1 (X4) is provided for enabling lamps when energized by controller 215 from VCC through driver 231. When energized, lamp 257 will glow to indicate a system Ready. When energized, lamp 259 will glow to indicate a system Recharge is occurring. When energized, lamp 245 will glow indicating that system is operating normally. When energized lamp 249 will glow indicating a system alert and action is required. A real time clock 219 is provided to assure system's ability to synchronize and interoperate with other processors and systems. The display 211 is shown with an LCD driver 213 that receives information from controller 215. A power tap VCC is shown for power distribution availability. A current limiting resistor R2 (X4) is provided to signal controller 215 that operator has a request. When switch 225 is pressed VCC will be sent to controller 215 to request that an up in value presently displayed be implemented. For example, if system is being updated an operator could increase a time or day function to initialize operating parameters. When switch 227 is pressed VCC will be sent to controller 215 to request that present values are entered. For example, if system values are correct operator will enter them by pressing switch 227. When switch 229 is pressed VCC will be sent to controller 215 to request that a down in value presently displayed be implemented. For example, if system is being updated an operator could decrease a time or day function to initialize operating parameters. When switch 247 is pressed VCC will be sent to controller 215 to initiate a test of ODBC functions.

Figure 8:
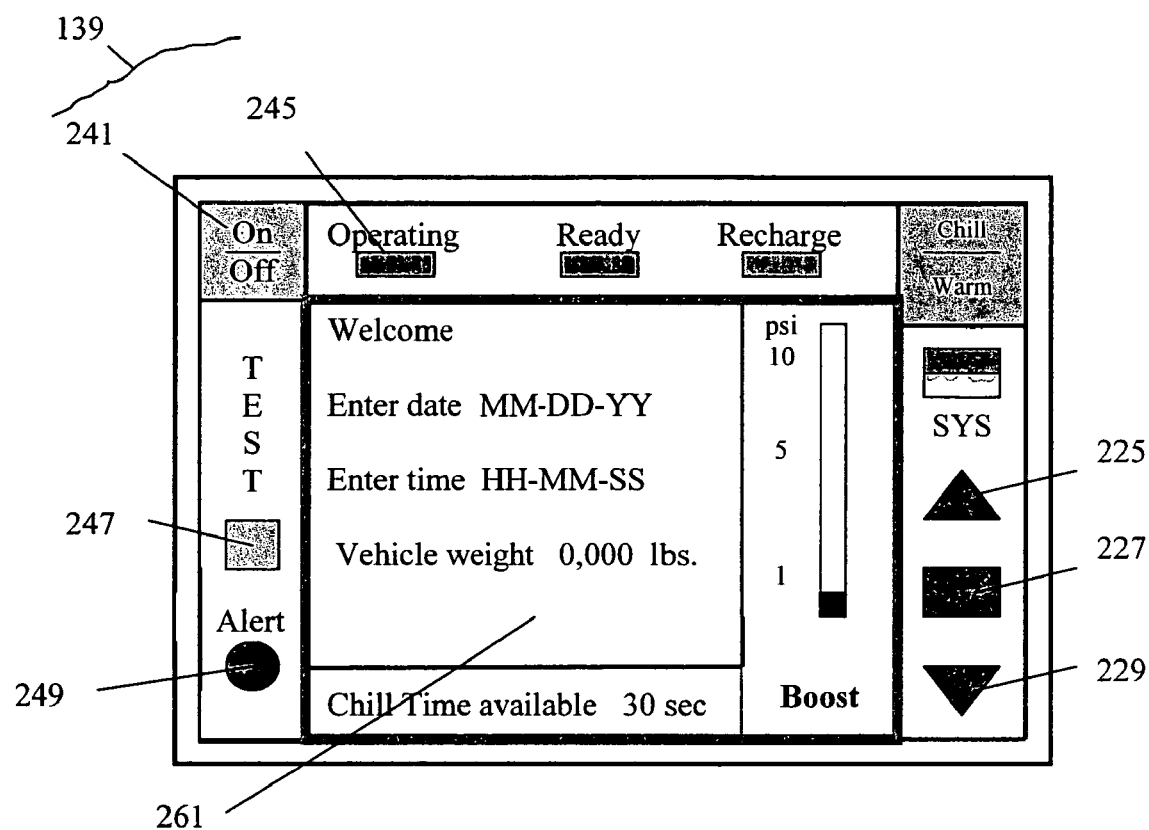
FIG. 8 is an interface operator screen for calibration of my conditioner.

FIG. 8 discloses an entry screen on display 139 for initial system calibration. The interface is the same as in FIG. 6 except area 261 is displaying a calibration interface. This configuration will utilize switches 241 and 247. The lamps 245 and 249 will also be incorporated. Operators will also employ switches 225, 229 and 227. Additionally, lamp 249 will be used. When all information is as desired operator will press 227 twice and normal display as in FIG. 6 will appear.

Installation

To install the preferred embodiment ODBC in a vehicle the following steps should be followed.

1. Install conditioner 101 assembly as shown in FIG. 1*a*. The area between the radiator wall in front of engine compartment and the grill should allow adequate mounting area and good airflow. A hood scoop is also potentially an attractive mounting location. System components may be dispersed to facilitate installation in a cramped or tight vehicle area.
2. A penetration in radiator wall where the outlet 134*o* (FIG. 1*d*) exits conditioner 101 must be made prior to installing assembly. Select a location that will allow the hose 158 to be routed directly to the throttle body intake 150 (FIG. 1*a*) or at some convenient location of the existing input plumbing.
3. With intake hole existing position conditioner 101 in location and select bracketry mounting locations that will stabilize assembly but not interfere with operation of assembly or existing devices. Mount bracketry and install inlet hoses. Both of these steps will be unique for each vehicle type.
4. Connect hose 158 of appropriate size from output 134*o* (FIG. 1*d*) to desired engine intake (before body 150). And install appropriate hose clamps. The body 150 ends of hose 158 will be unique for each vehicle type. The output 134*o* will use hose 110 type of appropriate length and clamp 10*a* to secure intake hose.
5. Sensors T1, T2, T3, and T4 will be installed with connectors 123*q* in conditioner 101 at locations shown FIG. 2. Referring to FIG. 1*e* the hole 239 should be drilled in manifold 144*m*. Position hole 233 to allow sensor AS maximum exposure to direct exhaust gas flow. The washer 233 (inside) with tabs 233*t* should next be welded (heliarc) to manifold 144*m* around hole 239. The washer 235 (inside) should be placed over nose on sensor AS. The sensor AS should be slid into washer 235 (inside) and hole 239. The washer 235 (outside) with tabs 233*t* should now be slid over cable side of sensor AS followed by washer 233 on top of washer 235. The wire 237 should be laced through loops (both sides) on inside and outside washer 233 and pulled to equal tightness to seal sensor AS to manifold 144*m*. The wire 237 ties should use aircraft bolt securing techniques and be checked and tightened after initial operation. The sensor T5 will have connector 123*q* but will have to be mounted in exhaust header. The sensor T5 can be drilled and threaded with a ¼" NF thread near sensor AS. Sensor AS comes with a cable and bnc connector on controller 133 end.
6. Auxiliary equipment including controller 133, power buffer 143, and auxiliary power 145 should be mounted as shown in FIG. 1*a*. Each engine compartment will be different where to mount these devices. The mounting sites should be selected for good airflow and clearance from existing devices. Mounting and orientation will determine length and routing of power cables.
7. Display 139 is best mounted in cabin for operator access. Depending on cabin and dashboard configuration of host vehicle display 139 can be mounted in operator view with brackets or 2-sided Velcro with glue backing.
8. Vehicle interface OBD-2 connector 126*p* is located under dash on driver side. Cable 126 vehicle end should be plugged into 126*p*. The cable 126 should be routed through firewall to engine compartment and plugged into controller 133 at 126*d*.
9. The cable 140 should plug in to display connector 209, routed through firewall and connected to controller 133 at connector 140*p*.
10. The cable 129 should be connected to the respective sensors T1 through T5. Care should be taken to avoid heat-producing devices and excess cabling should be neatly dressed away from interfering with existing devices.
11. The controller end of cable 129 should be connected to controller 133 at connector 129*t*.
12. The sensor AS cable 129*a* should be routed to controller 133 and connected to connector 129*b*
13. The actuator 123 cable 123*d* should be routed from controller 133 and connected to connector 123*c* at actuator 123.
14. The fan cable 123*d* should be routed from controller 133 and connected to fan 108 at connector 123*q*.
15. The TED 107 cable 156*c* should be routed from controller 133 to TED 107 and connected at connector 156*r*.
16. The motor 111 cable 156*m* should be routed from controller 133 to motor 111 and connected at connector 156*q*.
17. When all mounting and connections are complete an operator initializes ODBC (referring to FIG. 8) by selecting On at switch 241. The lamps 245 and 249 will illuminate. The system is requesting basic starting information in area 261. The cursor will initialize on the Enter date line, at MM. Operators can navigate by selecting a numerical increase by pressing switch 225, decreasing by pressing switch 229 and enter (and to next entry) switch 227. Operator should now enter current date, time and vehicle weight. Operators should follow the same procedure for time entry and weight. If an invalid entry is attempted lamp 249 will illuminate and cursor will highlight problem area. When all information is as desired operator will press 227 twice and normal display as in FIG. 6 will appear.
18. System calibration can be entered at anytime by pressing switches 247 and 227 until entry screen 261 as in FIG. 8 is displayed.
19. System will now operate as discussed in FIGS. 4 and 5 without operator intervention or as desired (warm mode, test, and calibrate).

In an embodiment, an ODBC may use multiple junctions or advanced technology (such as a nanostructure). TED that utilizes Peltier junctions can be stacked or distributed in series to accomplish required capacities and recharge cycle time. Advanced TED structures such as thermotunneling (CoolChips), superlattice structures (MIT's Lincoln Labs), and TE unicouples (JPL) should be incorporated into ODBC when available. Communications between modules, vehicle and external sources may include but are not limited to radio, magnetic, infrared or combination of these techniques. In some embodiments a remote collection or command scenario may supplement operation. While a positive displacement type of booster is discussed a more modestly priced blower (such as a leaf blower; example Makita UB 181 DZ) may be substituted with lower boost capabilities but distinct price advantages.

The invention claimed is:

1. An on demand boost conditioner system for raising an amount of air, maintaining safe operating temperature of intake air in to an internal combustion engine in a host vehicle, the system comprising an electronically controlled booster, an exchanger with an active conditioner element to chill or warm intake air, controllable by a smart controller, and a power buffer.

2. The on demand boost conditioner system of claim 1, wherein the smart controller is interfaced to an engine control unit for engine operation.

3. The on demand boost conditioner system of claim 1 wherein a collection of data are provided to and solution from the smart controller will smoothly enable the controlled chilling or warming of ambient air for intake into an internal combustion engine to:
   a. On demand chill intake air to increase density and oxygen content to enable increased engine power; and
   b. warm intake air for cold engine operation (cold starts and cold operation) to decrease damage to engine from cold operation.

4. The on demand boost conditioner system of claim 1, wherein the solution from the smart controller will smoothly enable raising the amount of intake air while maintaining a safe temperature of intake air into an internal combustion engine to: provide increase amounts of air with increased pressure to enable increased engine power.

5. The on demand boost conditioner system of claim 1 wherein the system operates without excessive parasitics on host system.

6. The on demand boost conditioner system of claim 1, wherein a collection of sensors are included to determine internal and external air temperature to provide data to the smart controller to increase the chilling, warming, and boosting functions of the system operational demands.

7. The on demand boost conditioner system of claim 1, wherein data are provided to the smart controller that incorporates a history of operating and hazardous conditions in the execution of system control functions.

8. The on demand boost conditioner system of claim 1, in which the power buffer monitors and controls power status and reports to the smart controller.

9. The on demand boost conditioner system of claim 1, in which multiple sensors are employed.

10. The on demand boost conditioner system of claim 1, in which an advanced piezoelectric sensor is employed.

11. The on demand boost conditioner system of claim 1, wherein a host vehicle interface is incorporated, providing data to the engine control unit with critical host vehicle engine operation parameters to enable the smart controller to enhance performance of the host engine.

12. The on demand boost conditioner system of claim 1, wherein the piezoelelectric sensor tracks changes in exhaust gas wavefront with immediate processor analysis by the smart controller facilitating identification of the host engine abnormalities.

13. The on demand boost conditioner system of claim 1, wherein identified abnormalities from the smart controller affect an increase of air entering a combustion chamber to respond to the host engine abnormalities.

14. The on demand boost conditioner system of claim 1, wherein an auxiliary power storage capability is incorporated that enables control of a system charging operation to minimize host engine power loading.

15. The on demand boost conditioner system of claim 1, wherein a switch to auxiliary power will facilitate the host engine to satisfy high-demand operations such as engine start and rapid acceleration.

16. The on demand boost conditioner system of claim 1, wherein the auxiliary power facilitates an operators ability to warm and store warmth prior for starting of a cold host engine.

17. The on demand boost conditioner system of claim 1, wherein the auxiliary power facilitates an operators ability to chill and store chill in an exchanger prior to an anticipated host engine demand.

18. The on demand boost conditioner system of claim 1, wherein the system's power buffer facilitates recharging of auxiliary power storage via action of host engine alternator.

19. The on demand boost conditioner system of claim 1, wherein a means for driver interface is provided that includes;
   a. facilitating control by the smart controller,
   b. facilitating manual operation of system,
   c. displaying system parameter data; and
   d. providing for testing of components, power buffer supervision, recharging, and power consumption.

20. A method of increasing power from an internal combustion engine comprising:
   raising the amount of air taken into the internal combustion engine, with an electronically controlled supercharger;
   conditioning air taken into the internal combustion engine through an exchanger with an active element;
   sensing operational demands through a sensor collection;
   controlling operational demands with sensor interface and smart controller operation;
   buffering system power to reduce parasitics and extend operation duration;
   interfacing the smart controller to a host vehicle engine control unit interoperation; and
   displaying system operational information for monitoring and controlling of system functions.

21. The method of increasing power from an internal combustion engine according to claim 20 wherein; determining demands of a host engine is accomplished by sensors sensing temperature and operational data; interfacing sensor data to the smart controller for supervision.

22. The method of increasing power from an internal combustion engine according to claim 20 wherein; reducing incoming air temperatures is accomplished by the exchanger with an active device.

* * * * *